(12) United States Patent
Millheam et al.

(10) Patent No.: US 12,264,591 B2
(45) Date of Patent: *Apr. 1, 2025

(54) COMPONENT REPAIR SYSTEM AND METHOD

(71) Applicants: General Electric Company, Schenectady, NY (US); Oliver Crispin Robotics Limited, Altrincham (GB)

(72) Inventors: Michael Robert Millheam, Cincinnati, OH (US); Andrew Crispin Graham, Badminton (GB); Byron Andrew Pritchard, Jr., Loveland, OH (US); David Scott Diwinsky, West Chester, OH (US); Jeremy Clyde Bailey, Liberty Township, OH (US); Michael Edward Eriksen, Cincinnati, OH (US); Ambarish Jayant Kulkarni, Glenville, NY (US)

(73) Assignees: General Electric Company, Evendale, OH (US); Oliver Crispin Robotics Limited, Altrincham (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/328,076

(22) Filed: Jun. 2, 2023

(65) Prior Publication Data

US 2024/0011413 A1    Jan. 11, 2024

Related U.S. Application Data

(62) Division of application No. 16/735,191, filed on Jan. 6, 2020, now Pat. No. 11,702,955.

(Continued)

(51) Int. Cl.
*F01D 25/00* (2006.01)
*F02C 7/30* (2006.01)

(52) U.S. Cl.
CPC .............. *F01D 25/002* (2013.01); *F02C 7/30* (2013.01); *F05D 2230/80* (2013.01)

(58) Field of Classification Search
CPC . F01D 25/002; F02C 7/30; F23R 2900/00004
See application file for complete search history.

(56) References Cited

U.S. PATENT DOCUMENTS

| 338,310 A | 3/1886 | Smith |
| 1,774,986 A | 9/1930 | MacKenzie |

(Continued)

FOREIGN PATENT DOCUMENTS

| CA | 2960352 A1 | 9/2017 |
| CA | 3077622 A1 | 4/2019 |

(Continued)

OTHER PUBLICATIONS

U.S. Appl. No. 17/144,487; Final Rejection mailed Feb. 12, 2024; (pp. 1-5).

(Continued)

*Primary Examiner* — Katheryn A Malatek
(74) *Attorney, Agent, or Firm* — Fitch, Even, Tabin & Flannery LLP

(57) ABSTRACT

A method of repairing a component of a gas turbine engine in situ, wherein the component includes a deposit, includes directing a flow of gas, which may be an oxygen-containing gas, to the deposit of the component; and heating the component including the deposit while the component is installed in the gas turbine engine and for a duration sufficient to substantially remove the deposit.

14 Claims, 14 Drawing Sheets

Related U.S. Application Data

(60) Provisional application No. 62/792,179, filed on Jan. 14, 2019.

(56) References Cited

U.S. PATENT DOCUMENTS

| | | |
|---|---|---|
| 1,987,972 A | 1/1935 | Rhein |
| 2,073,903 A | 3/1937 | O'Neil |
| 2,510,198 A | 6/1950 | Tesmer |
| 2,974,676 A | 3/1961 | Hagelthorn |
| 3,096,962 A | 7/1963 | Meijs |
| 3,190,286 A | 6/1965 | Stokes |
| 3,266,059 A | 8/1966 | Stelle |
| 3,270,641 A | 9/1966 | Gosselin |
| 3,583,393 A | 6/1971 | Takahashi |
| 3,625,084 A | 12/1971 | Siebert |
| 3,778,170 A | 12/1973 | Howell |
| 4,035,137 A | 7/1977 | Arand |
| 4,041,695 A | 8/1977 | Harper |
| 4,095,418 A | 6/1978 | Mansson |
| 4,170,489 A | 10/1979 | Magnus |
| 4,215,979 A * | 8/1980 | Morishita ............... F02C 7/264 431/263 |
| 4,227,584 A | 10/1980 | Driver |
| 4,242,863 A | 1/1981 | Bailey |
| 4,483,326 A | 11/1984 | Yamaka |
| 4,625,936 A | 12/1986 | Hadden, Sr. |
| 4,651,718 A | 3/1987 | Collins |
| 4,655,673 A | 4/1987 | Hawkes |
| 4,696,544 A | 9/1987 | Costella |
| 4,703,888 A | 11/1987 | Kawamura |
| 4,713,120 A | 12/1987 | Hodgens, II |
| 4,714,339 A | 12/1987 | Lau |
| 4,730,960 A | 3/1988 | Lewis |
| 4,735,501 A | 4/1988 | Ginsburgh |
| 4,757,258 A | 7/1988 | Kelly, Jr. |
| 4,773,395 A | 9/1988 | Suzuki |
| 4,790,294 A | 12/1988 | Allred, III |
| 4,790,624 A | 12/1988 | Van Hoye |
| 4,826,087 A | 5/1989 | Chinery |
| 4,846,573 A | 7/1989 | Taylor |
| 4,890,602 A | 1/1990 | Hake |
| 4,911,206 A | 3/1990 | Gropp |
| 4,972,048 A | 11/1990 | Martin |
| 4,991,565 A | 2/1991 | Takahashi |
| 5,090,205 A | 2/1992 | Foster |
| 5,102,221 A | 4/1992 | Desgranges |
| 5,164,826 A | 11/1992 | Dailey |
| 5,203,646 A | 4/1993 | Landsberger |
| 5,254,809 A | 10/1993 | Martin |
| 5,271,382 A | 12/1993 | Chikama |
| 5,323,962 A | 6/1994 | Jassby |
| 5,337,733 A | 8/1994 | Bauerfeind |
| 5,339,845 A | 8/1994 | Huddas |
| 5,372,162 A | 12/1994 | Frey |
| 5,385,102 A | 1/1995 | Villedieu |
| 5,390,402 A | 2/1995 | White |
| 5,399,164 A | 3/1995 | Snoke |
| 5,408,970 A | 4/1995 | Burkhard |
| 5,482,029 A | 1/1996 | Sekiguchi |
| 5,501,156 A | 3/1996 | Richter |
| 5,558,665 A | 9/1996 | Kieturakis |
| 5,644,394 A | 7/1997 | Owens |
| 5,667,023 A | 9/1997 | Harrell |
| 5,787,897 A | 8/1998 | Kieturakis |
| 5,807,241 A | 9/1998 | Heimberger |
| 5,816,769 A | 10/1998 | Bauer |
| 5,842,381 A | 12/1998 | Feiten |
| 6,123,273 A | 9/2000 | Loprinzo |
| 6,156,974 A | 12/2000 | Blase |
| 6,213,974 B1 | 4/2001 | Smith |
| 6,216,439 B1 | 4/2001 | Nakamoto |
| 6,287,206 B1 | 9/2001 | Stage |
| 6,311,704 B1 | 11/2001 | Foster |
| 6,371,148 B1 | 4/2002 | Tripp |
| 6,431,824 B2 | 8/2002 | Schotsch |
| 6,432,046 B1 | 8/2002 | Yarush |
| 6,478,033 B1 | 11/2002 | Foster |
| 6,481,195 B1 | 11/2002 | Blase |
| 6,542,230 B1 | 4/2003 | Luke |
| 6,643,877 B1 | 11/2003 | Amtenbrink |
| 6,698,456 B2 | 3/2004 | Neubauer |
| 6,783,491 B2 | 8/2004 | Saadat |
| 6,837,846 B2 | 1/2005 | Jaffe |
| 6,941,974 B2 | 9/2005 | Utaki |
| 6,943,570 B2 | 9/2005 | Duffy |
| 6,955,023 B2 | 10/2005 | Rotheroe |
| 6,957,781 B2 | 10/2005 | Gowens |
| 6,974,411 B2 | 12/2005 | Belson |
| 7,150,416 B2 | 12/2006 | Martin |
| 7,171,279 B2 | 1/2007 | Buckingham |
| 7,182,024 B2 | 2/2007 | Pfeiffer |
| 7,182,025 B2 | 2/2007 | Ghorbel |
| 7,185,407 B2 | 3/2007 | Boyl-Davis |
| 7,258,521 B2 | 8/2007 | Guerra |
| 7,509,735 B2 | 3/2009 | Philip |
| 7,543,518 B2 | 6/2009 | Buckingham |
| 7,559,340 B2 | 7/2009 | Ikeda |
| 7,571,735 B2 | 8/2009 | Wagner |
| 7,654,143 B2 | 2/2010 | Roney |
| 7,662,091 B2 | 2/2010 | Bagley |
| 7,677,181 B2 | 3/2010 | Boyl-Davis |
| 7,703,272 B2 | 4/2010 | Wagner |
| 7,707,704 B2 | 5/2010 | Crocker |
| 7,712,301 B1 | 5/2010 | Wagner |
| 7,718,894 B2 | 5/2010 | Blase |
| 7,741,563 B2 | 6/2010 | Harada |
| 7,849,878 B2 | 12/2010 | Kohler |
| 7,854,109 B2 | 12/2010 | Zubiate |
| 7,883,674 B2 | 2/2011 | Huang |
| 8,069,747 B2 | 12/2011 | Buckingham |
| 8,096,030 B2 | 1/2012 | Graichen |
| 8,100,031 B2 | 1/2012 | Zubiate |
| 8,125,755 B2 | 2/2012 | Garcia |
| 8,152,934 B2 | 4/2012 | Lee |
| 8,190,294 B2 | 5/2012 | Sjoestrand |
| 8,205,522 B2 | 6/2012 | Buckingham |
| 8,206,488 B2 | 6/2012 | Mantkowski |
| 8,299,785 B2 | 10/2012 | Bousquet |
| 8,303,243 B2 | 11/2012 | Fish |
| 8,327,518 B2 | 12/2012 | Koerner |
| 8,374,722 B2 | 2/2013 | Buckingham |
| 8,377,232 B2 | 2/2013 | Myers |
| 8,395,300 B2 | 3/2013 | Aabloo |
| 8,400,501 B2 | 3/2013 | Heyworth |
| 8,409,248 B2 | 4/2013 | Ginn |
| 8,453,533 B2 | 6/2013 | Ryland |
| 8,505,204 B2 | 8/2013 | Reverchon |
| 8,571,711 B2 | 10/2013 | Jacobsen |
| 8,635,849 B2 | 1/2014 | Tassone |
| 8,640,531 B2 | 2/2014 | Remillard |
| 8,674,222 B2 | 3/2014 | Hsieh |
| 8,758,232 B2 | 6/2014 | Graham |
| 8,786,848 B2 | 7/2014 | Hatcher |
| 8,833,826 B2 | 9/2014 | Garcia |
| 8,920,579 B2 | 12/2014 | Liedtke |
| 8,945,096 B2 | 2/2015 | Zubiate |
| 8,959,902 B2 | 2/2015 | Olivier |
| 8,991,163 B2 | 3/2015 | Olivier |
| 8,992,421 B2 | 3/2015 | Stand |
| 8,998,567 B2 | 4/2015 | Scipio |
| 9,016,159 B2 | 4/2015 | Kell |
| 9,016,293 B2 | 4/2015 | Battaglioli |
| 9,028,618 B2 | 5/2015 | Battaglioli |
| 9,127,234 B2 | 9/2015 | Hughes |
| 9,149,929 B2 | 10/2015 | Motzer |
| 9,187,700 B2 | 11/2015 | Huang |
| 9,220,398 B2 | 12/2015 | Woodley |
| 9,263,866 B2 | 2/2016 | Shimizu |
| 9,272,425 B2 | 3/2016 | Garcia |
| 9,294,737 B2 | 3/2016 | Hatcher, Jr. |
| 9,300,926 B2 | 3/2016 | Kell |
| 9,329,377 B2 | 5/2016 | Kell |
| 9,389,150 B2 | 7/2016 | Kimpel, Jr. |

(56) References Cited

U.S. PATENT DOCUMENTS

| | | |
|---|---|---|
| 9,399,299 B2 | 7/2016 | Hermey |
| 9,403,244 B2 | 8/2016 | Rautenberg |
| 9,409,292 B2 | 8/2016 | Smith |
| 9,435,750 B2 | 9/2016 | Matsumoto |
| 9,458,735 B1 | 10/2016 | Diwinsky |
| 9,492,906 B2 | 11/2016 | Rösing |
| 9,505,125 B2 | 11/2016 | Zubiate |
| 9,549,663 B2 | 1/2017 | Larkin |
| 9,581,440 B2 | 2/2017 | Ruhge |
| 9,726,628 B2 | 8/2017 | Ruhge |
| 9,733,195 B2 | 8/2017 | Colletti |
| 9,778,141 B2 | 10/2017 | Bancalari |
| 9,788,141 B2 | 10/2017 | Ponec |
| 9,857,002 B2 | 1/2018 | Ott |
| 9,902,024 B2 | 2/2018 | Ernst |
| 9,909,694 B2 | 3/2018 | Graham |
| 9,951,647 B2 | 4/2018 | Rawson |
| 10,060,569 B2 | 8/2018 | Sivacoe |
| 10,085,624 B2 | 10/2018 | Isoda |
| 10,197,473 B2 | 2/2019 | Diwinsky |
| 10,213,919 B2 | 2/2019 | Axinte |
| 10,238,457 B2 | 3/2019 | Herrell |
| 10,265,810 B2 | 4/2019 | Diwinsky |
| 10,428,993 B2 | 10/2019 | Whitefield |
| 10,470,831 B2 | 11/2019 | Cohen |
| 10,488,349 B2 | 11/2019 | Sibbach |
| 10,775,315 B2 | 9/2020 | Mekala |
| 10,884,232 B1 | 1/2021 | Trivedi |
| 10,926,403 B1 | 2/2021 | Asokan |
| 10,962,345 B2 | 3/2021 | Graham |
| 10,967,504 B2 | 4/2021 | Simaan |
| 11,371,437 B2 | 6/2022 | Hawke |
| 11,413,763 B2 | 8/2022 | Lee |
| 11,613,003 B2 | 3/2023 | Graham |
| 11,692,650 B2 | 7/2023 | Graham |
| 11,707,819 B2 | 7/2023 | Graham |
| 11,752,622 B2 | 9/2023 | Graham |
| 11,787,069 B2 | 10/2023 | Curle |
| 12,091,981 B2 | 9/2024 | Foxall |
| 12,194,620 B2 | 1/2025 | Graham |
| 2003/0171736 A1 | 9/2003 | Bon |
| 2003/0229420 A1 | 12/2003 | Buckingham |
| 2004/0059191 A1 | 3/2004 | Krupa |
| 2004/0138525 A1 | 7/2004 | Saadat |
| 2004/0186350 A1 | 9/2004 | Brenneman |
| 2004/0193016 A1 | 9/2004 | Root |
| 2004/0249367 A1 | 12/2004 | Saadat |
| 2004/0255422 A1 | 12/2004 | Reback |
| 2005/0075538 A1 | 4/2005 | Banik |
| 2005/0107667 A1 | 5/2005 | Danitz |
| 2005/0124856 A1 | 6/2005 | Fujikura |
| 2005/0148287 A1 | 7/2005 | Moeller |
| 2005/0203340 A1 | 9/2005 | Butler |
| 2005/0204489 A1 | 9/2005 | Velez, Jr. |
| 2005/0273085 A1 | 12/2005 | Hinman |
| 2006/0073348 A1 | 4/2006 | Farmer |
| 2006/0074283 A1 | 4/2006 | Henderson |
| 2006/0074383 A1 | 4/2006 | Boulais |
| 2006/0131908 A1 | 6/2006 | Tadano |
| 2006/0156851 A1 | 7/2006 | Jacobsen |
| 2006/0170386 A1 | 8/2006 | Anhalt |
| 2006/0258265 A1 | 11/2006 | Moeller |
| 2008/0066821 A1 | 3/2008 | Komiya |
| 2008/0149141 A1 | 6/2008 | Sales |
| 2008/0161971 A1 | 7/2008 | Buckingham |
| 2008/0199304 A1 | 8/2008 | Moran |
| 2008/0218728 A1 | 9/2008 | Kirschner |
| 2008/0250769 A1 | 10/2008 | Wagner |
| 2009/0084108 A1 | 4/2009 | Prociw |
| 2009/0084408 A1 | 4/2009 | Thiemann |
| 2009/0084411 A1 | 4/2009 | Woodcock |
| 2009/0086014 A1 | 4/2009 | Lea |
| 2009/0132085 A1 | 5/2009 | Sjostrand |
| 2009/0216245 A1 | 8/2009 | Viola |
| 2009/0216374 A1 | 8/2009 | Low |
| 2009/0255102 A1 | 10/2009 | Mcmasters |
| 2009/0255116 A1 | 10/2009 | Mcmasters |
| 2009/0256007 A1 | 10/2009 | Mcmasters |
| 2009/0320891 A1 | 12/2009 | Liedtke |
| 2010/0030377 A1 | 2/2010 | Unsworth |
| 2010/0037924 A1 | 2/2010 | Gebhardt |
| 2010/0108107 A1 | 5/2010 | Mantkowski |
| 2010/0116292 A1 | 5/2010 | Wagner |
| 2010/0147330 A1 | 6/2010 | Kohler |
| 2010/0160736 A1 | 6/2010 | Padget |
| 2010/0234988 A1 | 9/2010 | Buckingham |
| 2010/0256447 A1 | 10/2010 | Dubi |
| 2010/0275404 A1* | 11/2010 | Myers .................. F01D 25/002 |
| | | 15/316.1 |
| 2011/0030381 A1* | 2/2011 | Sordyl ..................... F02C 3/16 |
| | | 60/773 |
| 2011/0112527 A1 | 5/2011 | Hamilton, Jr. |
| 2011/0174108 A1 | 7/2011 | Graham |
| 2011/0295427 A1 | 12/2011 | Motzer |
| 2011/0303053 A1 | 12/2011 | Schneider |
| 2011/0313243 A1 | 12/2011 | Zubiate |
| 2012/0067158 A1 | 3/2012 | Kell |
| 2012/0125164 A1 | 5/2012 | Kozak |
| 2012/0167547 A1 | 7/2012 | Zhang |
| 2012/0184817 A1 | 7/2012 | Sugiyama |
| 2012/0197241 A1 | 8/2012 | Golden |
| 2012/0260497 A1 | 10/2012 | White |
| 2012/0279323 A1* | 11/2012 | Broda ................ G02B 23/2492 |
| | | 73/865.8 |
| 2012/0312103 A1 | 12/2012 | Hannott |
| 2013/0074879 A1 | 3/2013 | Battaglioli |
| 2013/0125753 A1 | 5/2013 | Ono |
| 2013/0192353 A1 | 8/2013 | Hatcher |
| 2013/0199040 A1 | 8/2013 | Dudeck |
| 2013/0226033 A1 | 8/2013 | Eskuri |
| 2013/0255410 A1 | 10/2013 | Lee |
| 2013/0335530 A1 | 12/2013 | Hatcher, Jr. |
| 2013/0340559 A1 | 12/2013 | Danitz |
| 2014/0005683 A1 | 1/2014 | Stand |
| 2014/0012288 A1 | 1/2014 | Darisse |
| 2014/0055596 A1 | 2/2014 | Hatcher, Jr. |
| 2014/0069460 A1 | 3/2014 | Kell |
| 2014/0125791 A1 | 5/2014 | Arellano |
| 2014/0133269 A1 | 5/2014 | Hansen |
| 2014/0260755 A1 | 9/2014 | Dong |
| 2014/0371764 A1 | 12/2014 | Oyola |
| 2015/0032252 A1 | 1/2015 | Galluzzo |
| 2015/0036150 A1 | 2/2015 | Kobayashi |
| 2015/0064008 A1 | 3/2015 | Lewis |
| 2015/0159557 A1 | 6/2015 | Scipio |
| 2015/0233263 A1 | 8/2015 | Battaglioli |
| 2015/0246449 A1 | 9/2015 | Sakai |
| 2015/0300920 A1 | 10/2015 | Deascanis |
| 2015/0338353 A1 | 11/2015 | Bancalari |
| 2015/0341600 A1 | 11/2015 | Hatcher, Jr. |
| 2015/0360629 A1 | 12/2015 | Sekino |
| 2016/0000629 A1 | 1/2016 | Jackson |
| 2016/0031078 A1 | 2/2016 | Kapoor |
| 2016/0032761 A1 | 2/2016 | Griffiths |
| 2016/0040803 A1 | 2/2016 | Steeger |
| 2016/0114488 A1 | 4/2016 | Mascorro Medina |
| 2016/0146036 A1 | 5/2016 | Richter |
| 2016/0174816 A1 | 6/2016 | Choset |
| 2016/0175057 A1 | 6/2016 | Ibach |
| 2016/0182776 A1 | 6/2016 | Huang |
| 2016/0186602 A1 | 6/2016 | Saenz |
| 2016/0262840 A1 | 9/2016 | Zubiate |
| 2016/0339584 A1 | 11/2016 | Esteban Finck |
| 2017/0023154 A1 | 1/2017 | Jaeker |
| 2017/0095922 A1 | 4/2017 | Licht |
| 2017/0100197 A1 | 4/2017 | Zubiate |
| 2017/0129110 A1 | 5/2017 | Ohm |
| 2017/0157719 A1* | 6/2017 | Diwinsky ............... F01D 25/24 |
| 2017/0167289 A1 | 6/2017 | Diwinsky |
| 2017/0167953 A1 | 6/2017 | Diwinsky |
| 2017/0175569 A1 | 6/2017 | Rawson |
| 2017/0191376 A1 | 7/2017 | Eriksen |
| 2017/0219814 A1 | 8/2017 | Letter |
| 2017/0219815 A1 | 8/2017 | Letter |

(56) References Cited

U.S. PATENT DOCUMENTS

| | | |
|---|---|---|
| 2017/0239762 A1 | 8/2017 | Roberts |
| 2017/0274484 A1 | 9/2017 | Roberts |
| 2017/0319048 A1 | 11/2017 | Ikeda |
| 2017/0328497 A1 | 11/2017 | Dantin |
| 2017/0359530 A1 | 12/2017 | Boudin |
| 2017/0361470 A1 | 12/2017 | Otero Del Real |
| 2018/0058233 A1 | 3/2018 | Norton |
| 2018/0071039 A1 | 3/2018 | Barnett |
| 2018/0094538 A1 | 4/2018 | Tibbetts |
| 2018/0119568 A1 | 5/2018 | Negoescu |
| 2018/0149038 A1 | 5/2018 | Eriksen |
| 2018/0156062 A1 | 6/2018 | Dede |
| 2018/0156132 A1 | 6/2018 | Dede |
| 2018/0231162 A1 | 8/2018 | Zeng |
| 2018/0313225 A1 | 11/2018 | Millhaem |
| 2018/0361960 A1 | 12/2018 | Yamamoto |
| 2019/0022877 A1 | 1/2019 | Akin |
| 2019/0046010 A1 | 2/2019 | Tojo |
| 2019/0054638 A1 | 2/2019 | Norton |
| 2019/0145498 A1 | 5/2019 | Yoon |
| 2019/0190190 A1 | 6/2019 | Bourgeas |
| 2019/0246878 A1 | 8/2019 | Bodner |
| 2019/0277770 A1 | 9/2019 | Mekala |
| 2019/0292938 A1* | 9/2019 | Wang .................. F01D 25/00 |
| 2019/0308319 A1 | 10/2019 | Walters |
| 2019/0358813 A1 | 11/2019 | Graham |
| 2019/0358833 A1 | 11/2019 | Graham |
| 2019/0360794 A1 | 11/2019 | Graham |
| 2019/0366536 A1 | 12/2019 | Graham |
| 2019/0383158 A1 | 12/2019 | Diwinsky |
| 2019/0383161 A1 | 12/2019 | Graham |
| 2020/0030377 A1 | 1/2020 | Zaghouani |
| 2020/0113412 A1 | 4/2020 | Jensen |
| 2020/0114497 A1 | 4/2020 | Graham |
| 2020/0114528 A1 | 4/2020 | Graham |
| 2020/0182345 A1 | 6/2020 | Gu |
| 2020/0205908 A1 | 7/2020 | Julian |
| 2020/0224552 A1 | 7/2020 | Millhaem |
| 2020/0316789 A1 | 10/2020 | Sohmshetty |
| 2020/0319119 A1 | 10/2020 | Peters |
| 2020/0359879 A1 | 11/2020 | Cahill |
| 2020/0405142 A1 | 12/2020 | Whitaker |
| 2021/0037354 A1 | 2/2021 | Peterson |
| 2021/0078165 A1 | 3/2021 | Tang |
| 2021/0102870 A1 | 4/2021 | Trivedi |
| 2021/0137354 A1 | 5/2021 | Bob |
| 2021/0223142 A1 | 7/2021 | Sasaki |
| 2021/0229269 A1 | 7/2021 | Graham |
| 2021/0229270 A1 | 7/2021 | Graham |
| 2021/0231239 A1 | 7/2021 | Graham |
| 2021/0285374 A1 | 9/2021 | Hawke |
| 2021/0388737 A1 | 12/2021 | Foxall |
| 2022/0221706 A1 | 7/2022 | Trivedi |
| 2022/0221707 A1 | 7/2022 | Trivedi |
| 2022/0290608 A1 | 9/2022 | Hawke |
| 2022/0314430 A1 | 10/2022 | Graham |
| 2023/0194234 A1 | 6/2023 | Graham |
| 2024/0280033 A1 | 8/2024 | Foxall |
| 2024/0326266 A1 | 10/2024 | Graham |

FOREIGN PATENT DOCUMENTS

| | | |
|---|---|---|
| CA | 3043720 A1 | 11/2019 |
| CN | 86101283 | 8/1986 |
| CN | 86101283 A | 8/1986 |
| CN | 1162516 | 10/1997 |
| CN | 1050781 C | 3/2000 |
| CN | 1656312 | 8/2005 |
| CN | 1678937 | 10/2005 |
| CN | 1903517 | 1/2007 |
| CN | 101048101 | 10/2007 |
| CN | 101048102 | 10/2007 |
| CN | 101528111 A | 9/2009 |
| CN | 101881218 | 11/2010 |
| CN | 201769177 | 3/2011 |
| CN | 201800016 | 4/2011 |
| CN | 102292013 A | 12/2011 |
| CN | 102687057 | 9/2012 |
| CN | 102711585 | 10/2012 |
| CN | 102729240 A | 10/2012 |
| CN | 102871636 | 1/2013 |
| CN | 203370761 U | 1/2014 |
| CN | 103895012 A | 7/2014 |
| CN | 104175325 | 12/2014 |
| CN | 104582909 A | 4/2015 |
| CN | 103639156 B | 7/2015 |
| CN | 104870141 | 8/2015 |
| CN | 105144514 | 12/2015 |
| CN | 105377116 | 3/2016 |
| CN | 105436127 A | 3/2016 |
| CN | 105927820 | 9/2016 |
| CN | 106113019 | 11/2016 |
| CN | 106163431 | 11/2016 |
| CN | 106427289 A | 2/2017 |
| CN | 106659438 | 5/2017 |
| CN | 106988798 | 7/2017 |
| CN | 107205622 | 9/2017 |
| CN | 107468339 A | 12/2017 |
| CN | 108356747 | 8/2018 |
| CN | 108472025 | 8/2018 |
| CN | 207941781 | 10/2018 |
| CN | 108972527 | 12/2018 |
| CN | 109068938 | 12/2018 |
| CN | 109476019 | 3/2019 |
| CN | 109561935 | 4/2019 |
| CN | 109716194 | 5/2019 |
| CN | 110001286 | 7/2019 |
| CN | 110462169 | 11/2019 |
| CN | 110529254 | 12/2019 |
| CN | 110757412 | 2/2020 |
| CN | 111037602 | 4/2020 |
| CN | 111486008 | 8/2020 |
| CN | 113146599 | 7/2021 |
| CN | 113232042 | 8/2021 |
| DE | 3504824 | 8/1986 |
| DE | 4102211 | 8/1991 |
| DE | 29902753 U | 6/1999 |
| DE | 10160922 | 5/2003 |
| DE | 102019002892 A1 | 10/2020 |
| DE | 102020106508 | 9/2021 |
| EP | 1216797 | 6/2002 |
| EP | 1216797 A1 | 6/2002 |
| EP | 1489269 A2 | 12/2004 |
| EP | 1574675 A2 | 9/2005 |
| EP | 2011619 A2 | 1/2009 |
| EP | 1914010 A3 | 9/2010 |
| EP | 2237931 A1 | 10/2010 |
| EP | 2267508 | 12/2010 |
| EP | 1967295 B1 | 1/2011 |
| EP | 2320262 | 5/2011 |
| EP | 2052792 A3 | 6/2011 |
| EP | 2353739 A1 | 8/2011 |
| EP | 2375104 | 10/2011 |
| EP | 2286933 B1 | 11/2011 |
| EP | 2275648 B1 | 3/2012 |
| EP | 1903188 B1 | 5/2013 |
| EP | 2597273 A2 | 5/2013 |
| EP | 2629655 | 8/2013 |
| EP | 3061923 A1 | 8/2016 |
| EP | 3072642 A2 | 9/2016 |
| EP | 1908928 B1 | 12/2016 |
| EP | 3153604 A1 | 4/2017 |
| EP | 3176365 A1 | 6/2017 |
| EP | 3572632 | 11/2019 |
| EP | 3572632 A1 | 11/2019 |
| EP | 3879075 | 9/2021 |
| FR | 2956608 A1 | 8/2011 |
| FR | 2995996 A1 | 3/2014 |
| FR | 3082136 A1 | 12/2019 |
| GB | 779248 | 7/1957 |
| GB | 1437405 A | 5/1976 |
| GB | 2199842 | 7/1988 |
| GB | 2228644 | 8/1990 |
| GB | 2228644 A | 8/1990 |

(56) References Cited

FOREIGN PATENT DOCUMENTS

| | | |
|---|---|---|
| JP | H10146316 A | 6/1998 |
| JP | 2006184832 A | 7/2006 |
| JP | 2013510339 A | 3/2013 |
| MX | 2010013223 A1 | 12/2010 |
| NO | 162227 B | 8/1989 |
| TW | 201341090 | 10/2013 |
| WO | 9116598 A1 | 10/1991 |
| WO | 0006336 A1 | 2/2000 |
| WO | 2009081164 A1 | 7/2009 |
| WO | 2011092891 | 8/2011 |
| WO | 2012042921 A1 | 4/2012 |
| WO | 2012054829 A2 | 4/2012 |
| WO | 2016063074 A2 | 4/2016 |
| WO | 2017037723 | 3/2017 |
| WO | 2017221982 A1 | 12/2017 |
| WO | 2018001967 A1 | 1/2018 |
| WO | 2019076876 A1 | 4/2019 |
| WO | 2019097688 | 5/2019 |
| WO | 2021040376 A1 | 3/2021 |

OTHER PUBLICATIONS

U.S. Appl. No. 16/898,629; Notice of Allowance and Fees Due (PTOL-85) mailed Jan. 17, 2024; (pp. 1-7).
U.S. Appl. No. 16/577,268; Final Rejection mailed Jul. 3, 2023; (pp. 1-26).
U.S. Appl. No. 16/577,268; Non-Final Rejection mailed Oct. 19, 2023; (pp. 1-30).
U.S. Appl. No. 16/696,025; Final Rejection mailed Dec. 28, 2023; (pp. 1-14).
U.S. Appl. No. 16/750,665; Notice of Allowance and Fees Due (PTOL-85) mailed Aug. 7, 2023; (pp. 1-8).
U.S. Appl. No. 16/898,629; Final Office Action mailed Oct. 10, 2023; (pp. 1-12).
U.S. Appl. No. 16/898,629; Non-Final Rejection mailed Jun. 7, 2023; (pp. 1-14).
U.S. Appl. No. 17/144,487; Final Rejection mailed Jul. 20, 2023; (pp. 1-7).
U.S. Appl. No. 17/144,487; Non-Final Rejection mailed Nov. 1, 2023; (pp. 1-15).
U.S. Appl. No. 17/824,691; Notice of Allowance and Fees Due (PTOL-85) mailed Jun. 21, 2023; (pp. 1-9).
U.S. Appl. No. 17/824,691; Notice of Allowance and Fees Due (PTOL-85) mailed Oct. 10, 2023; (pp. 1-8).
U.S. Appl. No. 16/696,025, filed Nov. 26, 2019.
U.S. Appl. No. 16/750,665, filed Jan. 23, 2020.
U.S. Appl. No. 16/750,743, filed Jan. 23, 2020.
U.S. Appl. No. 16/751,802, filed Jan. 24, 2020.
U.S. Appl. No. 16/813,829, filed Mar. 10, 2020.
U.S. Appl. No. 16/898,629, filed Jun. 11, 2020.
U.S. Appl. No. 17/144,487, filed Jan. 8, 2021.
FET20 (Wireless Borescope, Klein Tools, Jan. 2019) (Year: 2019).
Huang et al., In-Situ Continuous Coke Deposit Removal by Catalytic Steam Gasification for Fuel-Cooled Thermal Management, Journal of Engineering for Gas Turbines and Power, vol. 134, Oct. 2012, 8 Pages.
Mascarenas et al., "A Compliant Mechanism for Inspecting Extremely Confined Spaces" Smart Materials and Structures, vol. No. 26, pp. 1-16, Oct. 26, 2017.
U.S. Appl. No. 15/986,958, filed May 23, 2018.
US Final Office Action from U.S. Appl. No. 15/986,958 dated Sep. 9, 2020, 10 pgs.
US Non-Final Office Action from U.S. Appl. No. 15/986,958 dated Apr. 23, 2020, 12 pgs.
US Notice of Allowance and Notice of Allowability, dated Nov. 18, 2020, from U.S. Appl. No. 15/986,958, 9 pgs.
U.S. Appl. No. 16/751,802; Non-Final Rejection mailed Feb. 28, 2022; (pp. 1-12).
U.S. Appl. No. 16/750,743; Non-Final Rejection mailed Apr. 27, 2022; (pp. 1-12).
U.S. Appl. No. 16/751,802; Supplemental Notice of Allowance mailed Feb. 27, 2023; (pp. 1-4).
U.S. Appl. No. 16/577,268; Non-Final Rejection mailed Jan. 20, 2023; (pp. 1-29).
U.S. Appl. No. 16/577,331; Non-Final Rejection mailed Jan. 19, 2022; (pp. 1-8).
U.S. Appl. No. 16/577,331; Notice of Allowance and Fees Due (PTOL-85) mailed Feb. 15, 2023; (pp. 1-5).
U.S. Appl. No. 16/577,331; Notice of Allowance and Fees Due (PTOL-85) mailed Jul. 25, 2022; (pp. 1-5).
U.S. Appl. No. 16/577,331; Notice of Allowance and Fees Due (PTOL-85) mailed Nov. 7, 2022; (pp. 1-5).
U.S. Appl. No. 16/577,331; Notice of Allowance and Fees Due (PTOL-85) mailed Nov. 7, 2022; (pp. 1-16).
U.S. Appl. No. 16/696,025; Final Rejection mailed Sep. 16, 2022; (pp. 1-34).
U.S. Appl. No. 16/696,025; Non-Final Rejection mailed Mar. 28, 2023; (pp. 1-29).
U.S. Appl. No. 16/735,191; Non-Final Rejection mailed Aug. 3, 2022; (pp. 1-11).
U.S. Appl. No. 16/735,191; Notice of Allowance and Fees Due (PTOL-85) mailed Mar. 27, 2023; (pp. 1-5).
U.S. Appl. No. 16/735,191; Notice of Allowance and Fees Due (PTOL-85) mailed Dec. 8, 2022; (pp. 1-8).
U.S. Appl. No. 16/750,665; Non-Final Rejection mailed Jul. 20, 2022; (pp. 1-9).
U.S. Appl. No. 16/750,665; Notice of Allowance and Fees Due (PTOL-85) mailed Mar. 24, 2023; (pp. 1-6).
U.S. Appl. No. 16/750,665; Notice of Allowance and Fees Due (PTOL-85) mailed Nov. 17, 2022; (pp. 1-5).
U.S. Appl. No. 16/750,743; Final Rejection mailed Nov. 7, 2022; (pp. 1-13).
U.S. Appl. No. 16/750,743; Final Rejection mailed Nov. 7, 2022; (pp. 1-28).
U.S. Appl. No. 16/750,743; Notice of Allowance and Fees Due (PTOL-85) mailed Jan. 23, 2023; (pp. 1-5).
U.S. Appl. No. 16/750,743; Notice of Allowance and Fees Due (PTOL-85) mailed May 16, 2023; (pp. 1-5).
U.S. Appl. No. 16/751,802; Final Rejection mailed Jul. 28, 2022; (pp. 1-9).
U.S. Appl. No. 16/751,802; Notice of Allowance and Fees Due (PTOL-85) mailed Feb. 6, 2023; (pp. 1-5).
U.S. Appl. No. 16/751,802; Notice of Allowance and Fees Due (PTOL-85) mailed Oct. 19, 2022; (pp. 1-37).
U.S. Appl. No. 16/751,802; Notice of Allowance and Fees Due (PTOL-85) mailed Oct. 19, 2022; (pp. 1-7).
U.S. Appl. No. 16/898,629; Final Rejection mailed Feb. 28, 2023; (pp. 1-22).
U.S. Appl. No. 16/898,629; Non-Final Rejection mailed Sep. 13, 2022; (pp. 1-14).
U.S. Appl. No. 17/144,487; Final Rejection mailed Jan. 11, 2023; (pp. 1-5).
U.S. Appl. No. 17/144,487; Non-Final Rejection mailed Mar. 22, 2023; (pp. 1-6).
U.S. Appl. No. 17/144,487; Non-Final Rejection mailed Aug. 23, 2022; (pp. 1-6).
U.S. Appl. No. 17/219,577; Notice of Allowance and Fees Due (PTOL-85) mailed Jan. 4, 2023; (pp. 1-5).
Wickham et al., High Heat Flux Surface Coke Deposition and Removal Assessment, Technical Paper, Air Force Research Laboratory, Edwards AFB, Jan. 2015, California, 21 Pages.
U.S. Appl. No. 16/696,025; Final Rejection mailed Aug. 13, 2024; (pp. 1-25).
U.S. Appl. No. 16/898,629; Notice of Allowance and Fees Due (PTOL-85) mailed Aug. 2, 2024; (pp. 1-5).
U.S. Appl. No. 18/733,557, filed Jun. 4, 2024, entitled "Selectively Flexible Extension Tool".
U.S. Appl. No. 16/577,268; Notice of Allowance mailed Sep. 13, 2024; (pp. 1-16).
Bakhshi, M. et al., Tunnel Segmental Lining Geometry, Tolerance and Measurement, Tunnelling & Trenchless Conference, 2018, 10 pp.

(56) References Cited

OTHER PUBLICATIONS

International Search Report Corresponding to Application No. PCT/US2019/037022 on Nov. 15, 2019.
U.S. Appl. No. 16/008,475; Final Rejection mailed Mar. 2, 2023; (pp. 1-21).
U.S. Appl. No. 16/008,475; Final Rejection mailed Aug. 4, 2022; (pp. 1-8).
U.S. Appl. No. 16/008,475; Final Rejection mailed Dec. 15, 2023; (pp. 1-24).
U.S. Appl. No. 16/008,475; Non-Final Rejection mailed Apr. 22, 2024; (pp. 1-33).
U.S. Appl. No. 16/008,475; Non-Final Rejection mailed Jun. 15, 2023; (pp. 1-23).
U.S. Appl. No. 16/008,475; Non-Final Rejection mailed Oct. 21, 2022; (pp. 1-18).
U.S. Appl. No. 16/577,268; Notice of Allowance and Fees Due (PTOL-85) mailed Feb. 26, 2024; (pp. 1-12).
U.S. Appl. No. 16/696,025; Non-Final Rejection mailed May 7, 2024; (pp. 1-25).
U.S. Appl. No. 17/144,435; Non-Final Rejection mailed Mar. 11, 2024; (pp. 1-12).
U.S. Appl. No. 17/144,487; Non-Final Rejection mailed Apr. 18, 2024; (pp. 1-12).
U.S. Appl. No. 17/552,848; Requirement for Restriction/Election mailed Feb. 26, 2024; (pp. 1-8).
U.S. Appl. No. 16/577,268; Non-Final Rejection mailed Jun. 10, 2024; (pp. 1-28).
U.S. Appl. No. 17/552,848; Non-Final Rejection mailed Jun. 21, 2024; (pp. 1-38).
U.S. Appl. No. 16/008,475; Final Rejection mailed Nov. 4, 2024; (pp. 1-50).
U.S. Appl. No. 16/577,268; Notice of Allowance and Fees Due (PTOL-85) mailed Sep. 13, 2024; (pp. 1-15).
U.S. Appl. No. 17/144,487; Final Rejection mailed Sep. 18, 2024; (pp. 1-14).
U.S. Appl. No. 17/552,848; Final Rejection mailed Oct. 28, 2024; (pp. 1-23).
USPTO; U.S. Appl. No. 17/144,435; Final Rejection mailed Jan. 24, 2025; (pp. 1-12).
USPTO; U.S. Appl. No. 17/144,487; Final Rejection mailed Jan. 23, 2025; (pp. 1-18).
USPTO; U.S. Appl. No. 16/577,268; Notice of Allowance and Fees Due (PTOL-85) mailed Nov. 20, 2024; (pp. 1-15).
USPTO; U.S. Appl. No. 16/696,025; Non-Final Rejection mailed Jan. 14, 2025; (pp. 1-28).

\* cited by examiner

FIG. 10

COMPONENT REPAIR SYSTEM AND METHOD

CROSS-REFERENCE TO RELATED APPLICATIONS

This application is a division of U.S. application Ser. No. 16/735,191, filed Jan. 6, 2020, which is a non-provisional application claiming the benefit of priority under 35 U.S.C. § 119(e) to U.S. Provisional Application No. 62/792,179, filed Jan. 14, 2019, which are hereby incorporated by reference in their entireties.

FIELD

The present subject matter relates generally to a repair system for treating a deposit within a gas turbine engine, and a method for using the same.

BACKGROUND

Gas turbine engines generally operate at relatively high temperatures due to the combustion of fuel, high compressor pressure ratios, etc. Further, given advances in materials technology and other gas turbine engine technology, gas turbine engines (or at least certain sections thereof) are operating at higher temperatures and pressures than past machines. As such, at least certain recent gas turbine engines have begun utilizing a fuel flow to a combustion section of the gas turbine engine as a heat sink, as it may have a dual benefit of increasing an efficiency of the combustion process and providing an effective heat sink for the gas turbine engine.

However, increasing the temperatures and pressures of the gas turbine engines, as well as increasing the temperature of the fuel flow, may cause the fuel to form carbonaceous particles that may attach to the various fuel conveying components to form carbonaceous deposits within such components. Such may occur during operation of the gas turbine engines, or may occur during shutdown and soakback conditions where active cooling of certain fuel conveying components has been discontinued and heat transfers from hot flowpath components to relatively cooler parts, such as certain fuel conveying components. These deposits may limit a cross-sectional flow area for the fuel through the component, potentially negatively affecting an operability and/or functionality of such component. In order to remove the carbonaceous deposits, the component must generally be removed from the engine and sent away for cleaning.

However, such a process is expensive and time consuming. Accordingly, an improved method for cleaning carbonaceous deposits from components of gas turbine engines would be useful.

BRIEF DESCRIPTION

Aspects and advantages of the invention will be set forth in part in the following description, or may be obvious from the description, or may be learned through practice of the invention.

In an aspect of the present disclosure, a method of repairing a component of a gas turbine engine in situ is provided. The component includes a deposit. The method includes directing an insertion tube into an interior of the gas turbine engine such that a distal end of the insertion tube is positioned proximate the component; and providing a heated flow of gas through the insertion tube to heat the component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 10 is a schematic, cross-sectional view of a combustor assembly in accordance with another exemplary embodiment of the present disclosure.

DETAILED DESCRIPTION

Figure 1:
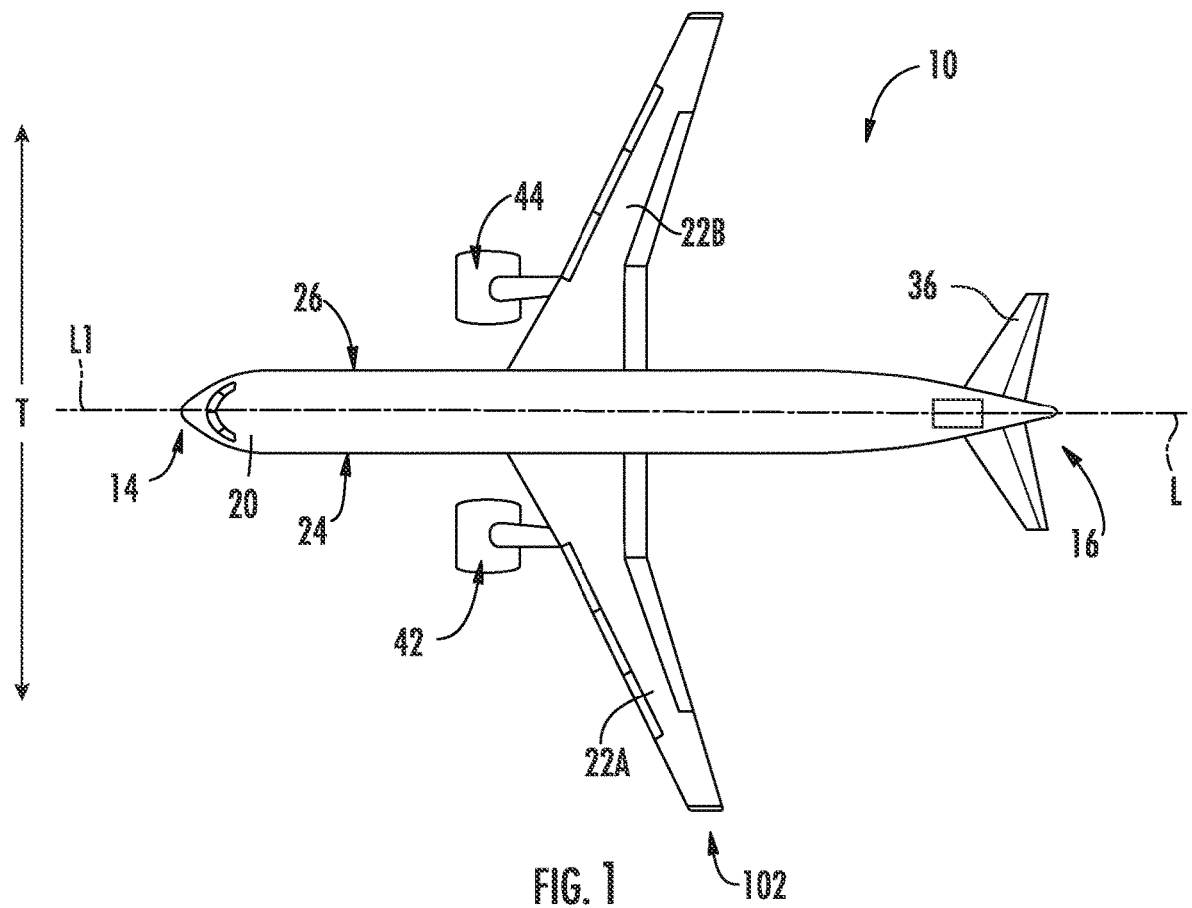
FIG. 1 is a top view of an aircraft in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components.

The terms "forward" and "aft" refer to relative positions within a component or system, and refer to the normal operational attitude of the component or system. For example, with regard to a gas turbine engine, forward refers to a position closer to an inlet of the gas turbine engine and aft refers to a position closer to an exhaust of the gas turbine engine.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 2:
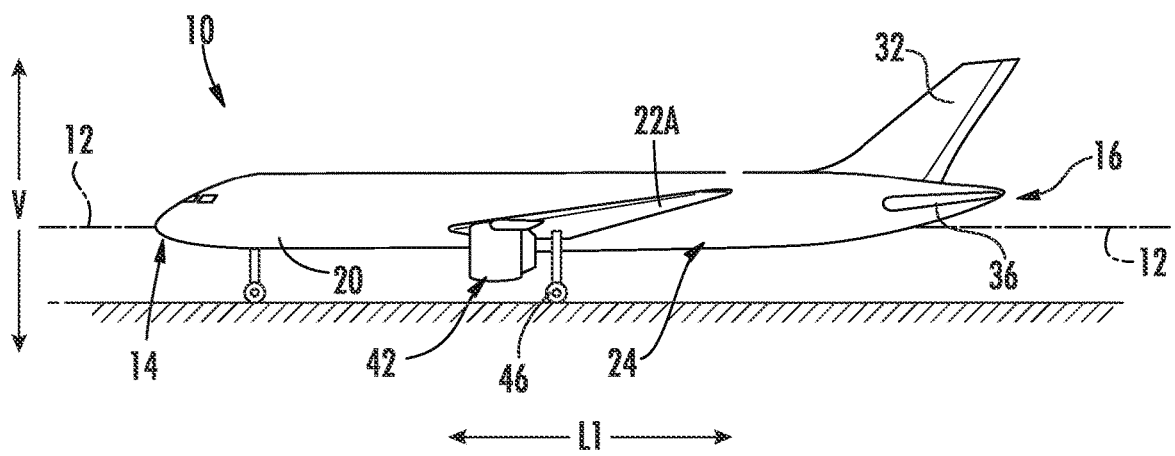
FIG. 2 is a side view of the exemplary aircraft of FIG. 1.

Referring now to the drawings, wherein identical numerals indicate the same elements throughout the Figs., FIG. 1 provides a top view of an exemplary aircraft 10 as may incorporate various embodiments of the present disclosure. FIG. 2 provides a port side 24 view of the aircraft 10 as illustrated in FIG. 1. As shown in FIGS. 1 and 2 collectively, the aircraft 10 defines a longitudinal direction L1 that extends therethrough, a vertical direction V, a transverse direction T, a forward end 14, and an aft end 16. Moreover, the aircraft 10 includes a fuselage 20, extending longitudinally from the forward end 14 of the aircraft 10 towards the aft end 16 of the aircraft 10, and a pair of wings 22, or rather, a first wing 22A and a second wing 22B. The exemplary aircraft 10 further includes a vertical stabilizer 32 and a pair of horizontal stabilizers 36.

Additionally, the exemplary aircraft 10 of FIGS. 1 and 2 includes a propulsion system, which for the embodiment depicted, includes a plurality of aircraft engines, at least one of which is mounted to each of the pair of wings 22A, 22B. Specifically, the plurality of aircraft engines includes a first aircraft engine 42 mounted to the first wing 22A and a second aircraft engine 44 mounted to the second wing 22B. In at least certain exemplary embodiments, the aircraft engines 42, 44 may be configured as turbofan jet engines (see, e.g., FIG. 2) suspended beneath the wings 22A, 22B in an under-wing configuration. Alternatively, however, in other exemplary embodiments any other suitable aircraft engine may be provided. For example, in other exemplary embodiments the first and/or second aircraft engines 42, 44 may alternatively be configured as turbojet engines, turboshaft engines, turboprop engines, etc. Further, in still other exemplary embodiments, the propulsion system may include one or more electric, or hybrid-electric, aircraft engines (e.g., electric fans). Moreover, it should be appreciated that in other exemplary embodiments of the present disclosure, the aircraft 10 may have any suitable configuration, including any suitable fuselage 20 configuration, wing(s) 22A, 22B configuration, stabilizer 32, 36 configuration, engine count and/or arrangement, etc.

Moreover, as will be appreciated from the description below, a repair system in accordance with certain exemplary embodiments of the present disclosure may be utilized on one or more of the aircraft engines 42, 44 while such aircraft engines 42, 44 are installed on/in the aircraft 10, as shown, to repair a component within an interior of such aircraft engines 42, 44.

Figure 3:
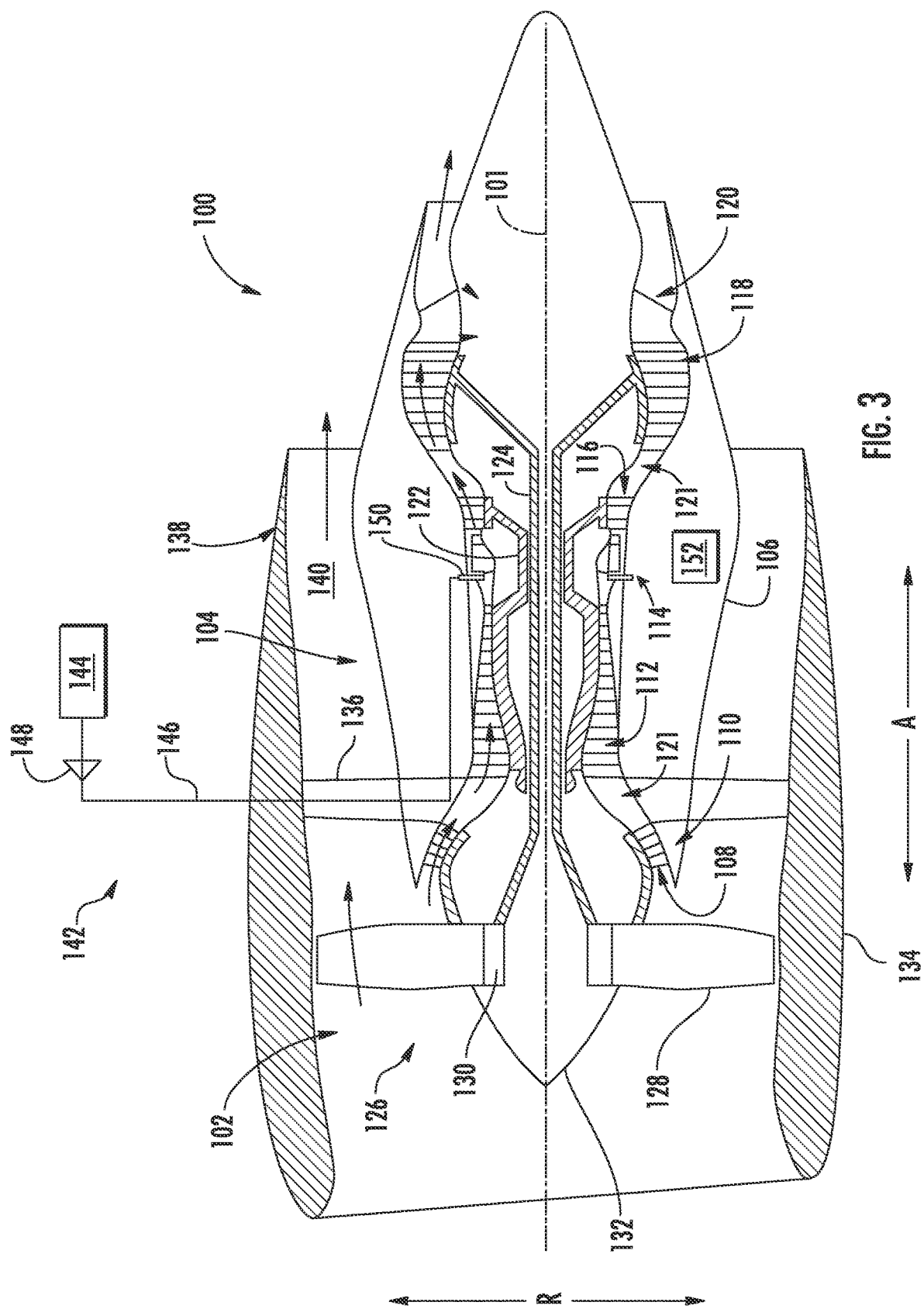
FIG. 3 is a schematic, cross-sectional view of a gas turbine engine in accordance with an exemplary embodiment of the present disclosure.

Referring now to FIG. 3, FIG. 3 provides a schematic, cross-sectional view of an engine in accordance with an exemplary embodiment of the present disclosure. The engine may be incorporated into a vehicle. For example, the engine may be an aeronautical engine incorporated into an aircraft, such as the aircraft 10 of FIGS. 1 and 2. Alternatively, however, the engine may be any other suitable type of engine for any other suitable vehicle.

For the embodiment depicted, the engine is configured as a high bypass turbofan engine 100. As shown in FIG. 3, the turbofan engine 100 defines an axial direction A (extending parallel to a longitudinal axis 101 provided for reference), a radial direction R, and a circumferential direction (extending about the axial direction A; not depicted in FIG. 3). In general, the turbofan engine 100 includes a fan section 102 and a turbomachine 104 disposed downstream from the fan section 102.

The exemplary turbomachine 104 depicted generally includes a substantially tubular outer casing 106 that defines an annular inlet 108. The turbofan engine 100 defines an interior within the outer casing 106. More specifically, the outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet nozzle exhaust section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The fan blades 128 and disk 130 are together rotatable about the longitudinal axis 101 by the LP shaft 124. The disk 130 is covered by rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

Referring still to FIG. 3, the turbofan engine 100 additionally includes a fluid system, which for the embodiment depicted is a fuel delivery system 142. For the embodiment shown, the fuel delivery system 142 generally includes a fuel source 144, such as a fuel tank, one or more fuel lines 146, a fuel pump 148, and a plurality of fuel nozzles 150. The one or more fuel lines 146 and fuel pump 148 provide a fuel flow through the fuel delivery system 142 to the combustion section 114 of the turbomachine 104 of the turbofan engine 100, and more specifically to the plurality of fuel nozzles 150, as will be explained in greater detail below. Notably, the turbofan engine 100 may additionally include other fluid systems, such as a lubrication oil system 152 (represented schematically), which may provide lubrication oil through one or more lubrication oil lines to lubricate bearings and other rotating components of the turbofan engine 100, as well as to manage thermal conditions of one or more of such components.

As will be appreciated from the description below, a repair system in accordance with certain exemplary embodiments of the present disclosure may be utilized on a component of the turbofan engine 100, in situ, i.e., while the component is installed within the turbofan engine 100. For example, as will be appreciated from the discussion below, a repair system in accordance with certain exemplary embodiments of the present disclosure may be utilized on a component of the fluid system (such as a fuel conveying component, an oil conveying component or both) to treat any carbonaceous deposits of such component(s), or other deposits of such component(s). Further, as will be appreciated from the description below, such may be accomplished without any appreciable disassembly of the turbofan engine 100 (e.g., disassembly to expose the component to be repaired).

It will be appreciated, however, that the exemplary turbofan engine 100 depicted in FIG. 3 is provided by way of example only. In other exemplary embodiments, any other suitable engine may be utilized with aspects of the present disclosure. For example, in other embodiments, the engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 3 is shown schematically as a direct drive, fixed-pitch turbofan engine, in other embodiments, a gas turbine engine of the present disclosure may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Further, although not depicted herein, in other embodiments the gas turbine engine may be any other suitable type of gas turbine engine, such as an industrial gas turbine engine incorporated into a power generation system, a nautical gas turbine engine or other aero-derivative gas turbine engine, etc.

Figure 4:
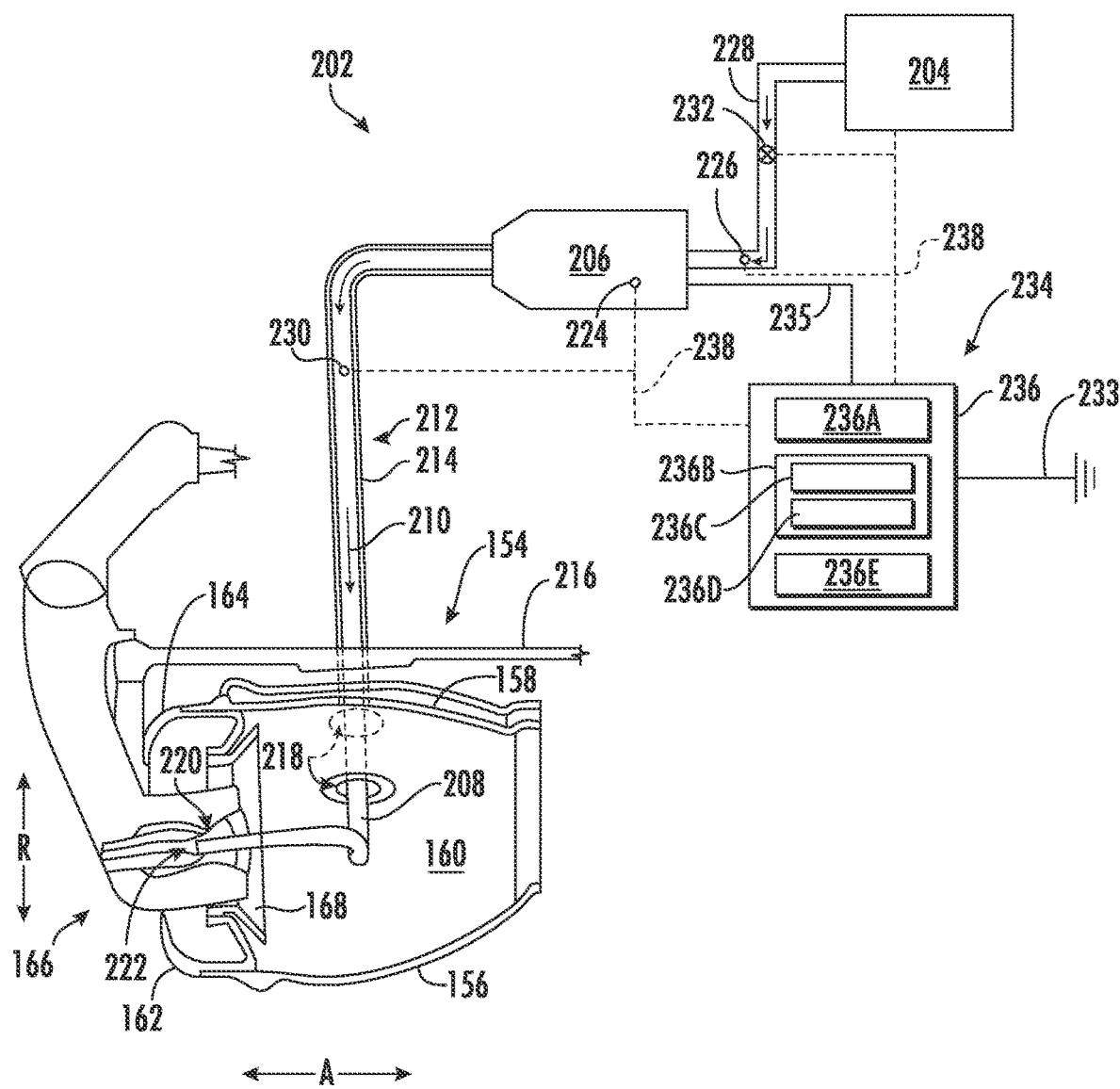
FIG. 4 is a schematic, cross-sectional view of a combustor assembly in accordance with an exemplary embodiment of the present disclosure.

Referring now to FIG. 4, a close-up, side, cross-sectional view is provided of a combustor assembly 154 in accordance with an exemplary embodiment of the present disclosure, along with a schematic view of a repair system 202 in accordance with the present disclosure. In certain exemplary embodiments, the combustor assembly 154 of FIG. 4 may be positioned in the combustion section 114 of the exemplary turbofan engine 100 of FIG. 3. Accordingly, it will be appreciated that the exemplary combustor assembly 154 generally defines an axial direction A, a radial direction R, and a circumferential direction C (see FIG. 6, discussed below).

Referring first to the exemplary combustor assembly 154 depicted, the combustor assembly 154 generally includes an inner liner 156 extending generally along the axial direction A, as well as an outer liner 158 also extending generally along the axial direction A. The inner and outer liners 156, 158 together at least partially define a combustion chamber 160 therebetween. The inner and outer liners 156, 158 are each attached to an annular dome. More particularly, the annular dome includes an inner dome section 162 attached to the inner liner 156 and an outer dome section 164 attached to the outer liner 158. The inner and outer dome section 162, 164 may be formed integrally (or alternatively may be formed of a plurality of components attached in any suitable manner) and may each extend along the circumferential direction C to define an annular shape.

The combustor assembly 154 further includes a fuel nozzle 166 positioned at least partially within the annular dome and a heat shield 168 positioned around the fuel nozzle 166. The exemplary heat shield 168, for the embodiment depicted, is attached to and extends between the outer dome section 164 and the inner dome section 162. The heat shield 168 is configured to protect certain components from the relatively extreme temperatures of the combustion chamber 160.

Further, the fuel nozzle 166 is more specifically disposed at least partially between the outer dome section 164 and the inner dome section 162 along the radial direction R. During operation, compressed air from a compressor section of a gas turbine engine within which the combustor assembly 154 is installed flows into or through the fuel nozzle 166, where the compressed air is mixed with a flow of fuel. The fuel-air mixture is provided to the combustion chamber 160 and ignited to create combustion gases within the combustion chamber 160. The inner and outer dome sections 162, 164 are configured to assist in providing such a flow of compressed air from the compressor section into or through the fuel nozzle 166.

Figure 5:
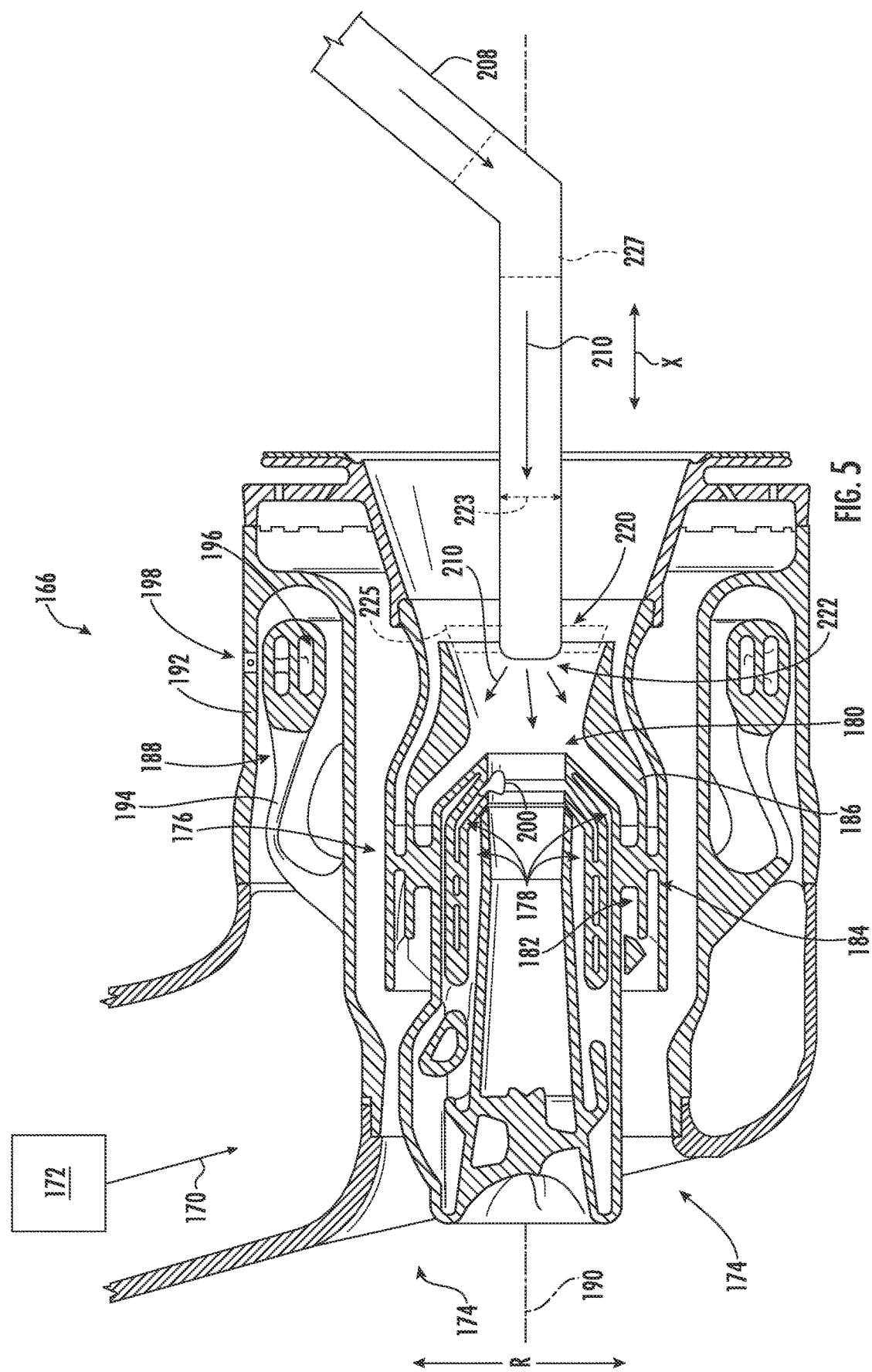
FIG. 5 is a schematic, cross-sectional view of an exemplary fuel nozzle of the combustion section of FIG. 4.

More particularly, referring now also to FIG. 5, a close-up, cross-sectional view of a portion of the exemplary fuel nozzle 166 of the combustor assembly 154 of FIG. 4 is generally provided. As will be appreciated, during operation of the combustor assembly 154, a liquid and/or gaseous fuel 170 is transported to the combustor assembly 154 by a fuel delivery system 172 (see, also, fuel delivery system 142 of FIG. 3), where it is introduced to the combustion chamber 160 at a downstream end generally as an atomized spray. In the exemplary embodiment depicted, the fuel nozzle 166 may inject fuel along the axial direction A. As will be appreciated during operation of the combustor assembly 154, the fuel nozzle 166 receives compressed air from an annular opening 174 at an upstream end and mixes such compressed air with the fuel 170 received from the fuel delivery system 172, resulting in a fuel/air mixture that is discharged into the combustion chamber 160 for combustion thereof.

More specifically, the exemplary fuel nozzle 166 depicted includes an inner body 176 defining a plurality of passages 178 defined therein for flowing fuel 170, compressed air, or a combination thereof therethrough and/or for mixing the fuel 170 and compressed air. The inner body 176 further defines a tip 180. Fuel 170 and/or compressed air may exit the inner body 176 through one or more of these passages 178 and/or the tip 180. Further, generally radially outward of the inner body 176, the fuel nozzle 166 includes a radially inner swirler 182 and a radially outer swirler 184, separated by a splitter 186. Compressed air through the radially inner swirler 182 and/or radially outer swirler 184 may further mix with the fuel 170 and/or compressed air exiting the inner body 176 through the tip 180. The mixture may then be provided to the combustion chamber 160.

Moreover, the exemplary fuel nozzle 166 may further be configured to inject fuel generally along the radial direction R. More specifically, the fuel delivery system 172 also supplies fuel to a main injection ring 188 of the fuel nozzle 166. The main injection ring 188 is, for the embodiment depicted, annular in form and surrounds the inner body 176. More specifically, the main injection ring 188 extends generally about a centerline 190 of the fuel nozzle 166. It is connected to the inner body 176 and to an outer body 192 by a suspension structure 194. The main injection ring 188 includes a main fuel gallery 196 (sometimes also referred to as a main fuel tube). A radial array of fuel orifices 198 formed in the main injection ring 188 communicate with the main fuel gallery 196. During engine operation, fuel 174 may be discharged through the fuel orifices 198.

Referring to FIGS. 4 and 5 generally, it will be appreciated that during operation of the combustor assembly 154, and more specifically, of the gas turbine engine including the combustor assembly 154, certain components may be exposed to relatively high operating temperatures. The relatively high operating temperatures may cause one or more of the fuel conveying components and/or oil conveying components (not shown) to generate carbonaceous deposits due to high temperature pyrolysis of the fuel 170 or oil, respectively, conveyed therethrough. For example, the relatively high operating temperatures may cause one or more of the fuel conveying components and/or oil conveying components to form coke deposits. For example, in certain exemplary embodiments, the fuel nozzle 166 depicted in FIGS. 4 and 5 may form coke deposits, or other carbonaceous deposits, during operation, e.g., within one or more of the passages 178, at the tip 180, within the radial array of fuel orifices 198, etc. These carbonaceous deposits may negatively affect the operability of the fuel nozzle 166 by inhibiting compressed air flow, fuel flow, etc. A sample deposit 200 is depicted in FIG. 5. Although the deposit 200 is generally internal to the fuel nozzle 166, it should be appreciated that similar carbonaceous deposits could be located at any other suitable location internal to the fuel nozzle 166 or external to the fuel nozzle 166. Additionally, it will be appreciated that in other embodiments, deposits other than carbonaceous deposits may be treated using the systems and methods herein (e.g., deposits formed from particle buildup in a fuel flow).

Accordingly, referring back generally to FIG. 4, the present disclosure generally provides for a system for repairing a component of a gas turbine engine having a carbonaceous deposit in situ. More specifically, the present disclosure provides for a repair system 202 for a fuel conveying component or an oil conveying component of a gas turbine engine having a carbonaceous deposit, for repairing such component in situ. For the embodiments depicted, the repair system 202 is more specifically for a fuel conveying component, and more specifically, still, for the fuel nozzle 166. However, as will be appreciated from the discussion below, the repair system 202 may additionally, or alternatively, be utilized on any other suitable component with a carbonaceous deposit. To repair the component, in accordance with embodiments of the disclosure, the deposit is substantially removed from the component. The removal generally includes conversion of the deposit to a gaseous by-product, such as by burning, pyrolysis, or other reaction. The conversion process includes the application of heat, and may further include a gaseous reactant, such as oxygen or other reagent, or an inert gas, such as argon. In certain embodiments, the conversion of the deposit occurs by burning the deposit from the component. In other certain embodiments, the deposit is converted to a gaseous by-product by pyrolysis.

As is depicted in FIG. 4, the repair system 202 generally includes a pressurized gas source 204, a gas heater 206 in airflow communication with the pressurized gas source 204, and an insertion tube 208 in airflow communication with the gas heater 206. The insertion tube 208 is configured for receiving a flow of gas 210 from the gas heater 206, which more specifically is a heated and pressurized flow of gas 210. More specifically, for the embodiment shown, the repair system 202 further includes an insulated supply line 212 extending between the gas heater 206 and the insertion tube 208 for providing the flow of heated and pressurized gas 210 from the gas heater 206 to the insertion tube 208.

With respect to the pressurized gas source 204, the pressurized gas source 204 may be an air compressor or other facility or shop air supply. The pressurized gas source 204 may therefore be generally referred to as a pressurized air source. The gas source 204 may be configured to generate an airflow through the repair system 202 of at least about two standard cubic feet per minute ("scfm"), such as at least about three scfm, such as at least about five scfm, such as at least about seven scfm, and up to about one hundred and fifty scfm, such as up to about one hundred scfm, such as up to about fifty scfm, such as up to about twenty scfm. Further, the pressurized gas source 204 may be configured such that a pressure of the flow of gas 210 through the repair system 202 is at least about ten pounds per square inch relative to ambient atmospheric pressure ("psid"), such as at least about twenty psid, such as at least about thirty psid, and up to about 2500 psid, such as up to about 1000 psid, such as up to about two hundred psid, such as up to about one hundred psid.

Further, the gas heater 206 may receive the pressurized flow of gas 210 from the pressurized gas source 204, and heat such pressurized flow of gas 210 to a desired temperature. In at least certain exemplary embodiments, the gas heater 206 may be configured to heat the flow of gas 210 from the pressurized gas source 204 to a temperature of at least about 500 degrees Fahrenheit, such as at least about 700 degrees Fahrenheit, and up to about 1500 degrees Fahrenheit. As will be appreciated, however, the pressurized and now heated flow of gas 210 may lose some heat downstream of the gas heater 206 and prior to exiting the repair system 202, as will be explained in more detail below.

Referring still to FIG. 4, in order to reduce a temperature loss of the pressurized and heated flow of gas 210 from the gas heater 206, the insulated supply line 212 includes an insulation layer 214 substantially completely surrounding the insulated supply line 212, substantially along a length of the supply line 212. In such a manner, the insulated supply line 212 may minimize an amount of temperature loss of the pressurized and heated flow of gas 210 between the gas heater 206 and insertion tube 208.

Moreover, it will be appreciated that in certain exemplary embodiments, the gas may be an oxygen-containing gas. For example, the gas may be a substantially pure oxygen gas, or some other gas mixture having at least about 10% oxygen, such as at least about 15% oxygen, such as at least about 25% oxygen, such as at least about 50% oxygen, such as at least about 75% oxygen. Additionally or alternatively, the gas may be a gas mixture having up to about 75% oxygen, such as up to about 50% oxygen, such as up to about 35% oxygen. Moreover, in still other embodiments, the gas 210 may be a substantially oxygen-free gas (e.g., less than 10% oxygen or less than 5% oxygen), such as an inert gas. When the gas 210 contains a sufficient amount of oxygen, or when otherwise heated in the presence of oxygen (see, e.g., FIG. 10), the carbonaceous deposit of the component may be substantially removed through burning (e.g., oxidation of the deposit due to a reaction between the deposit and oxygen, accelerated by heat). By contrast, when the gas 210 lacks a sufficient amount of oxygen, the carbonaceous deposit of the component may be substantially removed through pyrolysis (e.g., application of heat in the absence or near absence of oxygen).

With reference now particularly to the insertion tube 208, it will be appreciated that combustor assembly 154 is enclosed by a casing 216. The casing 216 and, for the embodiment shown, the outer liner 158 of the combustor assembly 154, together define an access port 218. The access port 218 may be, e.g., an igniter port of the combustor assembly 154 or any other suitable access port 218 (e.g., a borescope hole, etc.), currently existing or added in the future. The insertion tube 208 defines a distal end 220 having an airflow outlet 222. The insertion tube 208 is inserted into an interior of the gas turbine engine, such that the distal end 220 (and airflow outlet 222) is positioned proximate the component of the gas turbine engine having the carbonaceous deposit. More specifically, for the exemplary embodiment depicted in FIGS. 4 and 5, the insertion tube 208 is inserted through the access port 218 and directed into/at least partially through the combustion chamber 160, such that the distal end 220 of the insertion tube 208 and the airflow outlet 222 are positioned proximate the fuel nozzle 166. It will be appreciated, that as used herein, the term "proximate," with reference to the relative positioning of the distal end 220 of the insertion tube 208 to the component having the carbonaceous deposit, refers to the distal end 220 being within a proximity of such component such that a majority of the heated and pressurized flow of gas 210 through the insertion tube 208 and out the airflow outlet 222 reaches the component without substantial loss of temperature (e.g., less than 25% temperature loss). For example, in certain embodiments, depending on the operating conditions of the repair system 202 and ambient conditions, "proximate" may refer to being, e.g., within about ten inches of the component, such as within about eight inches of the component, such as within about six inches of the component, such as within about four inches of the component, such as within about two inches of the component, or may refer to being within the component.

More specifically, referring briefly now particularly to FIG. 5, depicting the distal end 220 of the insertion tube 208 of the repair system 202 depicted in FIG. 4, it will be appreciated that for the exemplary repair system 202 depicted, the insertion tube 208 defines an inner diameter 223. For the embodiment depicted, the inner diameter 223 is a maximum inner diameter at the last 10% of the insertion tube 208 (based on a total length of the insertion tube 208). The airflow outlet 222 is positioned at a distance less than about ten times the inner diameter 223, such as less than about five times the inner diameter 223, from the component being repaired to ensure a desired, relatively high velocity impingement of the flow of gas 210 is directed onto the component.

Notably, however, for the embodiment shown, the airflow outlet 222 is positioned at least partially within the component, or rather at least partially within the nozzle 166. As such, it will generally be appreciated that the repair system 202 may flow the heated and pressurized flow of gas 210 onto, into, and/or through the component including the carbonaceous deposit, which again for the embodiment shown is the fuel nozzle 166. More specifically, for the embodiment depicted, the distal end 220 of the insertion tube 208 is positioned such that the airflow outlet 222 is oriented towards the tip 180 of the inner body 176. In such a manner, the repair system 202 may be configured to flow the heated and pressurized flow of gas 210 onto, into, and over the inner body 176 of the fuel nozzle 166 for a certain duration to substantially remove any carbonaceous deposits (e.g., coke deposits), effectively cleaning the fuel nozzle 166 of the carbonaceous deposits in situ (i.e., while the fuel nozzle 166 is installed in the gas turbine engine), and further without having to appreciably disassemble the gas turbine engine (e.g., remove components to expose the fuel nozzle 166). It will be appreciated that as used herein, the term "substantially remove" with respect to a deposit on or in a component refers to removing at least about 50% of such deposit by volume, such as at least about 75% of such deposit by volume, such as at least about 90% of such deposit by volume.

Referring still to FIG. 5, it will further be appreciated that the repair system 202 may include features for ensuring the airflow outlet 222 of the insertion tube 208 is positioned and oriented in a desired manner. More specifically, as is depicted in phantom, it will be appreciated that the exemplary insertion tube 208 may include an alignment feature 225 positioned at the distal end 220, proximate the airflow outlet 222. The alignment feature 225 may define a shape corresponding to a feature of the component being repaired, and more specifically for the embodiment shown, corresponding to an inside surface of the splitter 186. For example, the alignment feature 225 may be a protrusion, such as a circular protrusion configured to engage the inside surface of the splitter 186 when installed in a desired position.

Further for the embodiment depicted, the repair system 202 additionally includes feature(s) for reducing a potential for damage of the component being repaired. More specifically, the insertion tube 208 may be a compliant insertion tube configured to prevent undesirably high contact pressures on the component being repaired. For the embodiment depicted, the insertion tube 208 more specifically includes a flexible section 227. The flexible section 227 may be configured to elastically deform to accommodate any inaccuracy in the positioning of the insertion tube 208, accommodate tolerances in the gas turbine engine and repair system 202, accommodate dimensional changes due to thermal expansion of, e.g., the component being repaired, etc. Accordingly, in at least certain exemplary embodiments, the flexible section 227 may be configured to elastically deform in length (direction X in FIG. 5) a distance of up to about fifty times the internal diameter 223, such as up to about thirty times the internal diameter 223, such as up to about fifteen times the internal diameter 223, and at least about 0.5 times the internal diameter 223, such as at least about 1.5 times the internal diameter 223, such as at least about five times the internal diameter 223. Further, the flexible section 227 may be configured to elastically deform in a plane perpendicular to a lengthwise direction of the insertion tube 208 (i.e., in a plane perpendicular to direction X in FIG. 5) at the distal end 220 a distance of at least about 0.5 times the internal diameter 223, such as at least about 1.5 times the internal diameter 223, and up to about ten times the internal diameter 223. In such a manner, it will be appreciated that the flexible section 227 may be formed at least partially of an elastomeric material, may have a "sleeved" configuration, may include bellows, etc.

Referring now again to FIG. 4, it will further be appreciated that the repair system 202 further includes one or more sensors for sensing data indicative of one or more operating conditions of the repair system 202. For example, for the embodiment shown, the repair system 202 includes a first sensor 224 operably coupled to the gas heater 206 for sensing data indicative of one or more operating conditions of the gas heater 206 (such as, e.g., data indicative of a temperature of the flow of gas 210 exiting the gas heater 206), a second sensor 226 operably connected to a gas flow path 228 between the pressurized gas source 204 and the gas heater 206 for sensing data indicative of the flow of gas 210 through such gas flow path 228 (e.g., data indicative of a temperature, pressure, flow rate, etc.), and a third sensor 230 operably connected to the insulated supply line 212 for sensing data indicative of the flow of gas 210 through the insulated supply line 212 (e.g., data indicative of a temperature, pressure, flow rate, etc.). Additionally, the exemplary repair system 202 includes a valve 232 positioned within the gas flow path 228 between the pressurized gas source 204 and the gas heater 206. The valve 232 may modulate the flow of gas 210 through such gas flow path 228 (e.g., volume). Alternatively, in other embodiments, the valve 232 may be positioned in the insulated supply line 212 or elsewhere. Alternatively still, the repair system 202 may include multiple valves, or alternatively, may not include any valves.

It will further be appreciated that the exemplary repair system 202 further includes a controller 234. The exemplary controller 234 depicted in FIG. 4 is configured to receive the data sensed from the one or more sensors and, e.g., make control decisions for the repair system 202 based on the received data. The exemplary controller 234 is further electrically coupled to a power grid 233 for receiving power and directing such power in a desired manner to the gas heater 206 (e.g., a desired amount) through an electric line 235.

Referring particularly to the operation of the controller 234, in at least certain embodiments, the controller 234 can include one or more computing device(s) 236. The computing device(s) 236 can include one or more processor(s) 236A and one or more memory device(s) 236B. The one or more processor(s) 236A can include any suitable processing device, such as a microprocessor, microcontroller, integrated circuit, logic device, and/or other suitable processing device. The one or more memory device(s) 236B can include one or more computer-readable media, including, but not limited to, non-transitory computer-readable media, RAM, ROM, hard drives, flash drives, and/or other memory devices.

The one or more memory device(s) 236B can store information accessible by the one or more processor(s) 236A, including computer-readable instructions 236C that can be executed by the one or more processor(s) 236A. The instructions 236C can be any set of instructions that when executed by the one or more processor(s) 236A, cause the one or more processor(s) 236A to perform operations. In some embodiments, the instructions 236C can be executed by the one or more processor(s) 236A to cause the one or more processor(s) 236A to perform operations, such as any of the operations and functions for which the controller 234 and/or the computing device(s) 236 are configured, the operations for operating the repair system 202 (e.g, method 500), as described herein, and/or any other operations or functions of the one or more computing device(s) 236. The instructions 236C can be software written in any suitable programming language or can be implemented in hardware. Additionally, and/or alternatively, the instructions 236C can be executed in logically and/or virtually separate threads on processor(s) 236A. The memory device(s) 236B can further store data 236D that can be accessed by the processor(s) 236A.

The computing device(s) 236 can also include a network interface 236E used to communicate, for example, with the other components of the repair system 202, the gas turbine engine being repaired, the aircraft incorporating the gas turbine engine, etc. For example, in the embodiment depicted, as noted above, the gas turbine engine and/or repair system 202 includes one or more sensors for sensing data indicative of one or more parameters of the repair system 202, the gas turbine engine, or both. The controller 234 is operably coupled to the one or more sensors through, e.g., the network interface, such that the controller 234 may receive data indicative of various operating parameters sensed by the one or more sensors during operation. More specifically, for the embodiment shown, the plurality of sensors, valve 232, pressurized gas source 204, and gas heater 206 are each operably connected to the controller 234 through a wireless communications network 238 interfacing with the network interface 236E. However, in other embodiments, the repair system 202 may additionally, or alternatively, utilize one or more wired communication networks, or other suitable communications networks. The network interface 236E can include any suitable components for interfacing with the one or more wired/wireless communications network(s), including for example, transmitters, receivers, ports, controllers, antennas, and/or other suitable components.

In such a manner, as briefly noted above, it will be appreciated that the controller 234 of the repair system 202 may be configured to make control decisions based on the sensed data. For example, the controller 234 may be configured to control the gas heater 206 (e.g., by controlling a power provided thereto) and/or the pressurized gas source 204 based on the sensed data to ensure the flow of gas 210 provided through the repair system 202 and to the component is at a desired temperature and at a desired flowrate, pressure, etc. In such a manner, it will further be appreciated that the controller 234 may generally implement one or more of the method steps of the method 500 described below with reference to FIG. 10. For example, the controller 234 may be configured to provide a heated flow of gas 210 through the insertion tube 208 (or rather through the airflow outlet 222) according to a ramp-up temperature schedule, subsequently provide the heated flow of gas 210 through the insertion tube 208 (or rather through the airflow outlet 222) at or about the desired temperature for a certain duration of time, and subsequently provide the heated flow of gas 210 through the insertion tube 208 (or rather through the airflow outlet 222) according to a ramp-down temperature schedule.

Figure 6:
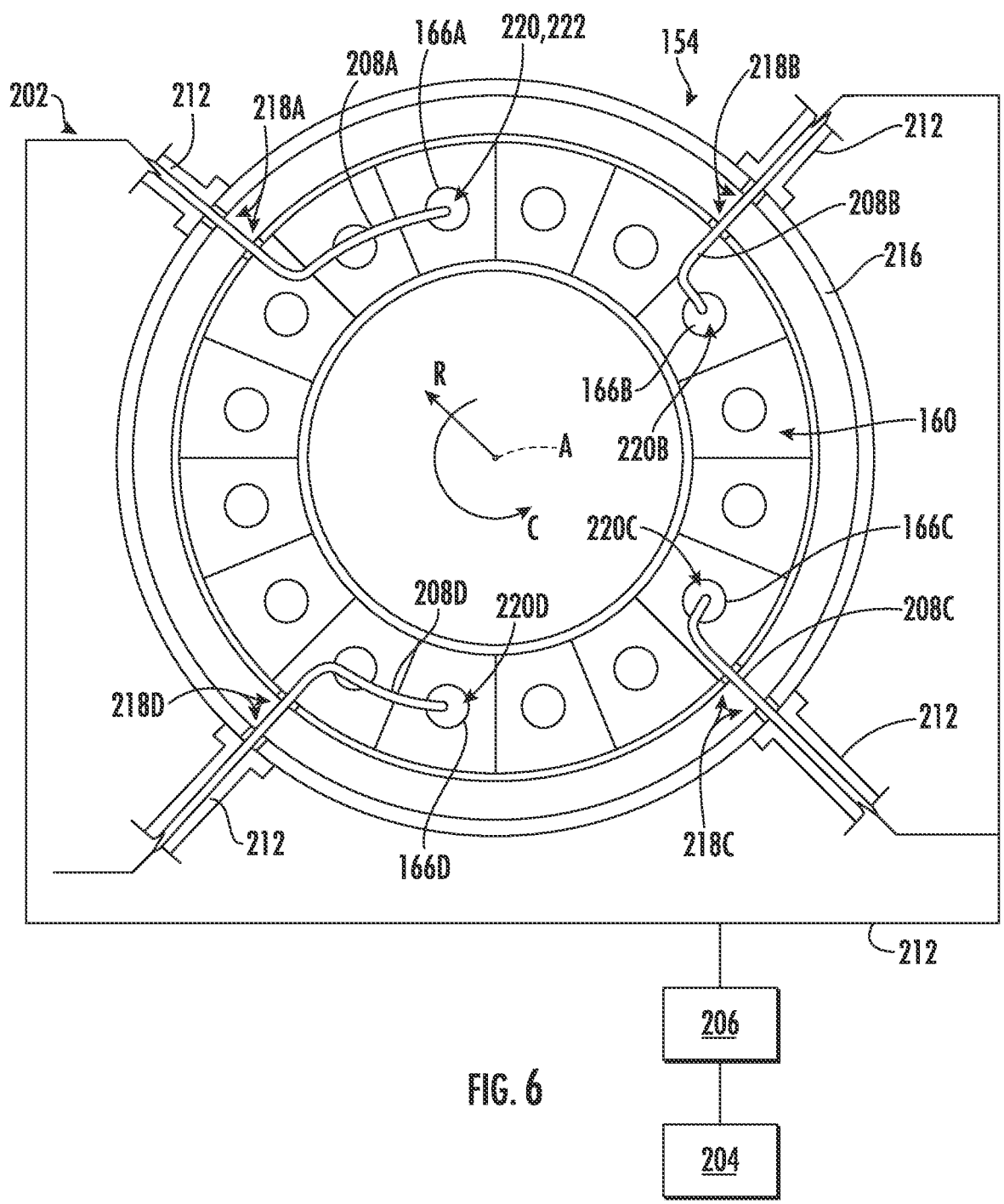
FIG. 6 is an axial, aft-looking-forward view of a combustion chamber of the exemplary combustor assembly of FIG. 4.

Referring now to FIG. 6, an axial, aft-looking-forward view of the combustion chamber 160 of the exemplary combustor assembly 154 of FIG. 4 is provided. As will be appreciated, the above-described fuel nozzle 166 is a first fuel nozzle 166A of a plurality of fuel nozzles 166 arranged along the circumferential direction C of the combustor assembly 154. It will further be appreciated that the access port 218 described above is a first access port 218A of a plurality of circumferentially arranged access ports 218. More specifically, for the embodiment shown, the gas turbine engine and combustor assembly 154 defines four access ports 218A, 218B, 218C, 218D spaced equally along the circumferential direction C.

Further, still, for the embodiment shown, it will be appreciated that the above-described insertion tube 208 is a first insertion tube 208A of a plurality of insertion tubes 208 of the repair system 202. More specifically, the repair system 202 further includes a second insertion tube 208B, a third insertion tube 208C, and a fourth insertion tube 208D. The second insertion tube 208B defines a second distal end 220B and is configured to be inserted into the interior of the gas turbine engine such that the second distal end 220B of the second insertion tube 208B is positioned proximate a second fuel nozzle 166B of the plurality of fuel nozzles 166 of the gas turbine engine. Similarly, the third insertion tube 208C is configured to be inserted such that a third distal end 220C is positioned proximate a third fuel nozzle 166C of the plurality of fuel nozzles 166, and the fourth insertion tube 208D is configured to be inserted such that a fourth distal end 220D is positioned proximate a fourth fuel nozzle 166D of the plurality of fuel nozzles 166.

Notably, for the embodiment shown, the first insertion tube 208A defines a first geometry, the second insertion tube 208B defines a second geometry, the third insertion tube 208C defines a third geometry, and a fourth insertion tube 208D defines a fourth geometry. The first geometry, second geometry, third geometry, and fourth geometry are all unique (i.e., different from one another). In such a manner, it will be appreciated that the various insertion tubes 208A, 208B, 208C, and 208D may be utilized to repair components, or rather, combustor nozzles 166, located at different positions relative to the closest access port 218. In such a manner, the various insertion tubes 208A, 208B, 208C, and 208D of the repair system 202 depicted may be utilized to repair each of the plurality of combustor fuel nozzles 166.

Notably, in certain exemplary aspects, two or more of the insertion tubes 208A, 208B, 208C, and 208D may be connected to the gas heater 206 and configured to be run simultaneously, or alternatively they may be run individually. More specifically, for the embodiment shown, each of the insertion tubes 208A, 208B, 208C, and 208D are in airflow communication with the gas heater 206 through an insulated supply line 212. In such a manner, each of the insertion tubes 208A, 208B, 208C, and 208D may be run simultaneously. Alternatively, however, the repair system 202 may include, e.g., valves to run any suitable combination simultaneously (such as two insertion tubes, three insertion tubes, or four insertion tubes). Further, still, in other embodiments, the repair system 202 may only be configured to run one insertion tube at a time.

It will be appreciated that the exemplary gas turbine engine, combustor assembly 154, and repair system 202 described above are provided by way of example only. In other exemplary embodiments, one or more the exemplary gas turbine engine, combustor assembly 154, and repair system 202 may be configured in any other suitable manner. For example, in other embodiments, the fuel nozzle(s) 166 may be configured in any other suitable manner (such as, e.g., as a rich burn fuel nozzle), and/or the repair system 202 may be utilized to repair other aspects of the fuel nozzle(s) 166, such as the one or more radial fuel ports 198. In such an exemplary embodiment, a distal end 220 of a respective insertion tube 208 may be positioned proximate the plurality of radial fuel ports 198. Further, in other embodiments, the repair system 202 may be utilized to repair other fuel conveying components, such as afterburners, fuel spray bars of an augmentor, fuel burner tubes, fuel circuits, fuel lines, fuel valves, etc. Moreover, in still other embodiments, the repair system 202 may be utilized to repair one or more oil conveying components, such as one or more components of an oil system of the gas turbine engine, such as a lubrication oil system.

Moreover, it will be appreciated that for the exemplary embodiments described above with reference to, e.g., FIGS. 4 through 6, the insertion tubes 208 are generally configured as rigid insertion tubes 208 having a fixed geometry. For example, the insertion tubes 208 may be formed of a steel, a steel alloy, etc. However, in other embodiments, the repair system 202 may additionally, or alternatively, utilize insertion tube 208 having any other suitable configuration.

Figure 7:
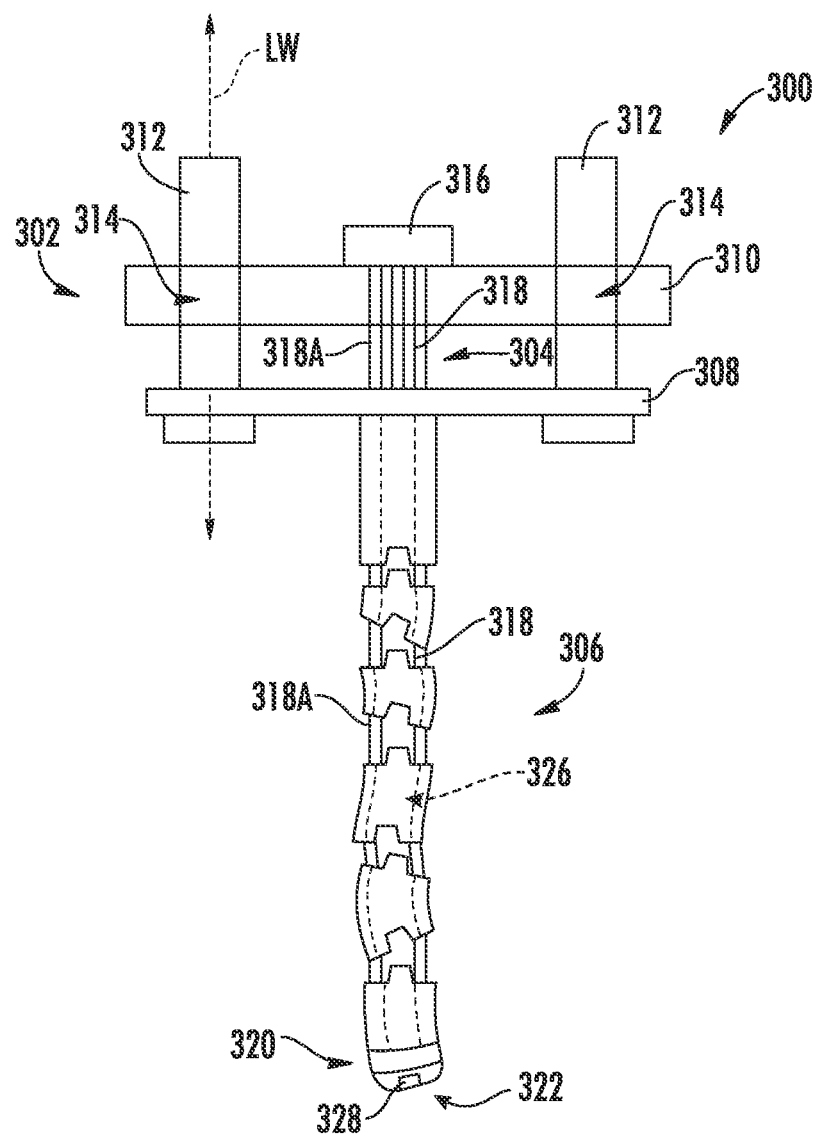
FIG. 7 is a schematic view of a selectively flexible insertion tube in accordance with an exemplary embodiment of the present disclosure in a slacked position
Figure 8:
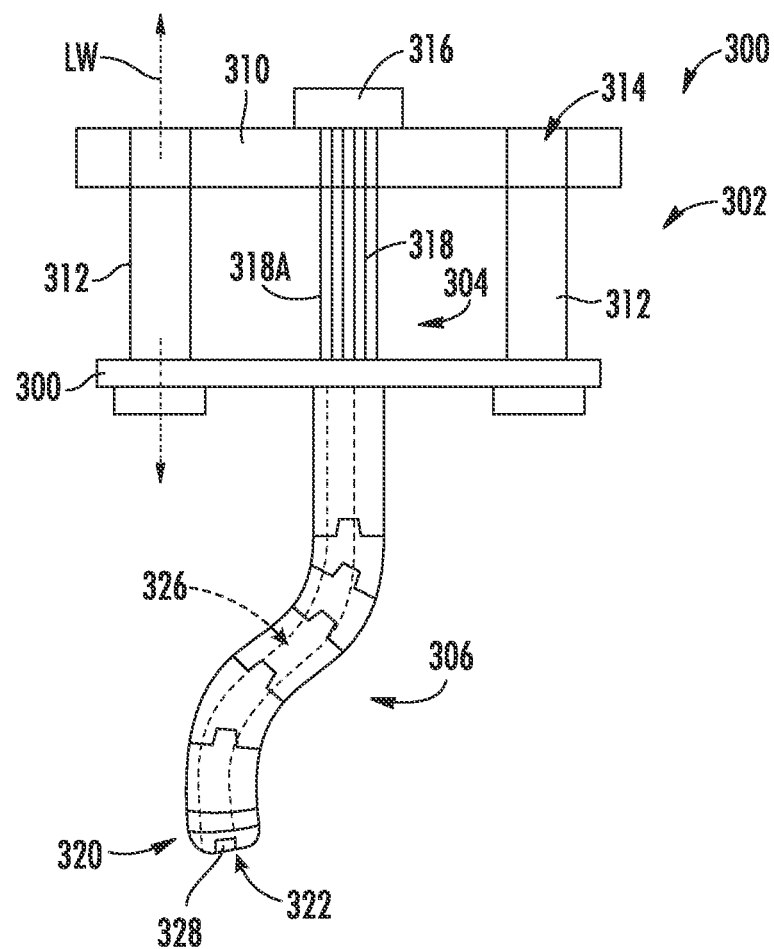
FIG. 8 is a schematic view of the exemplary selectively flexible insertion tube of FIG. 7 in a tensioned position.

For example, referring briefly to FIGS. 7 and 8, in certain exemplary embodiments, the insertion tube 208 may be configured as a selectively flexible insertion tube movable between a flexible position (see FIG. 7) and a rigid position (see FIG. 8). FIG. 7 is a schematic view of a selectively flexible insertion tube 300 in accordance with an exemplary embodiment of the present disclosure in a slacked or flexible position; and FIG. 8 is a schematic view of the exemplary insertion tube 300 of FIG. 7 in a tensioned or rigid position.

The insertion tube 300 generally includes a base 302, a line assembly 304, and a plurality of sequentially arranged links 306. The base 302 generally includes a first plate 308, a second plate 310, and one or more extension guides 312. For the embodiment depicted, the one or more extension guides 312 includes a pair of extension guides 312 fixedly coupled to the first plate 308 and extending in a lengthwise direction LW. The second plate 310 of the base 302 includes openings 314 corresponding to the pair of extension guides 312, such that the second plate 310 is slidable along the extension guides 312 in the lengthwise direction LW away from the first plate 308 and towards the first plate 308.

The line assembly 304 generally includes a root 304 coupled to the second plate 310 of the base 302 and a plurality of lines 318 extending from the root 304. The plurality of lines 318 includes a first line 318A, and the first line 318A (along with the rest of the lines 318 for the embodiment shown) is operable with the plurality of sequentially arranged links 306 to move the plurality of sequentially arranged links 306 between the slacked/flexible position (FIG. 7) and the tensioned/rigid position (FIG. 8). The links 306 are spaced from one another when in the slacked position to allow the plurality of sequentially arranged links 306 to pivotably move relative to one another. By contrast, the plurality of sequentially arranged links 306 are pressed against one another when in the tensioned position to rigidly fix the plurality of sequentially arranged links 306 to one another. As noted, for the embodiment shown, each of the plurality of lines 318 is operable with the plurality of sequentially arranged links 306 to move the plurality of sequentially arranged links 306 between the slacked position and the tensioned position. For example, the plurality of lines 318 may be tensioned by the base 302 to press the plurality of links 306 against one another, such that the links 306 are fixed relative to one another (due at least in part to the correspondingly shaped geometries at the longitudinal ends of the individual links 306). It will be appreciated that each of these lines 318 may be configured as cables, ropes, threads, etc. Accordingly, it will be appreciated that the lines 318 are generally flexible (i.e., will not prevent the plurality of sequentially arranged links 306 from pivotably moving relative to one another in the slacked position).

Briefly, for the embodiment depicted, it will be appreciated that the insertion tube 300 depicted further defines a gas passage 326 therethrough. The plurality of sequentially arranged links 306, and more specifically, the gas passage 326, may be in airflow communication with a gas heater 206 through an insulated supply line 212 (see FIG. 4). Further, the insertion tube 300 defines a distal end 320 and defines a gas outlet 322 at the distal end 320. In such a manner, the gas passage 326 of the insertion tube 300 may receive a heated and pressurized flow of gas from the insulation supply line 212, and provide such heated and pressurized flow of gas through the gas outlet 322 at the distal end 220.

Further, as is depicted schematically, the insertion tube 300 also includes a tool implement 328 coupled to the link 306 at the distal end 320. For the embodiment shown, the tool implement 328 may include one or more sensors, cameras, or both. However, in other embodiments, the tool implement 328 may be configured in any other suitable manner, or may be omitted.

Further, in still other exemplary embodiments, the insertion tube 208 may be configured in still other suitable manners. For example, referring now to FIG. 9, an insertion tube 208 is provided configured as a robotic arm assembly 400, sometimes also referred to as a "snake-arm" assembly, in accordance with an exemplary embodiment of the present disclosure. The robotic arm assembly 400 generally defines a vertical direction V2, a longitudinal direction L2, and a lateral direction (perpendicular to the longitudinal direction L2 and vertical direction V2; not shown), and further generally includes a base 402 and a robotic arm 404. The robotic arm 404 defines a distal end 420 defining a gas outlet 422. Although not depicted, the robotic arm 404 defines a gas passage therethrough. The gas passage may be directly in airflow communication with an insulated supply line 212 and/or gas heater 206, or alternatively may be in airflow communication through the base 402.

For the embodiment shown, the base 402 generally includes one or more motors 406 operable with the robotic arm 404 to actuate the robotic arm 404. Accordingly, the robotic arm assembly 400 depicted may be referred to as a motorized robotic arm assembly. Additionally, the robotic arm 404, for the embodiment depicted, includes a plurality of segments 408 (also referred to as "links") sequentially arranged and extending from the base 402 between a root end 410 and the distal end 420, e.g., generally along the longitudinal direction L2 of the robotic arm assembly 400 for the embodiment shown. Notably, the robotic arm 404 is, for the embodiment depicted, coupled to the base 402 at its root end 410.

Figure 9:
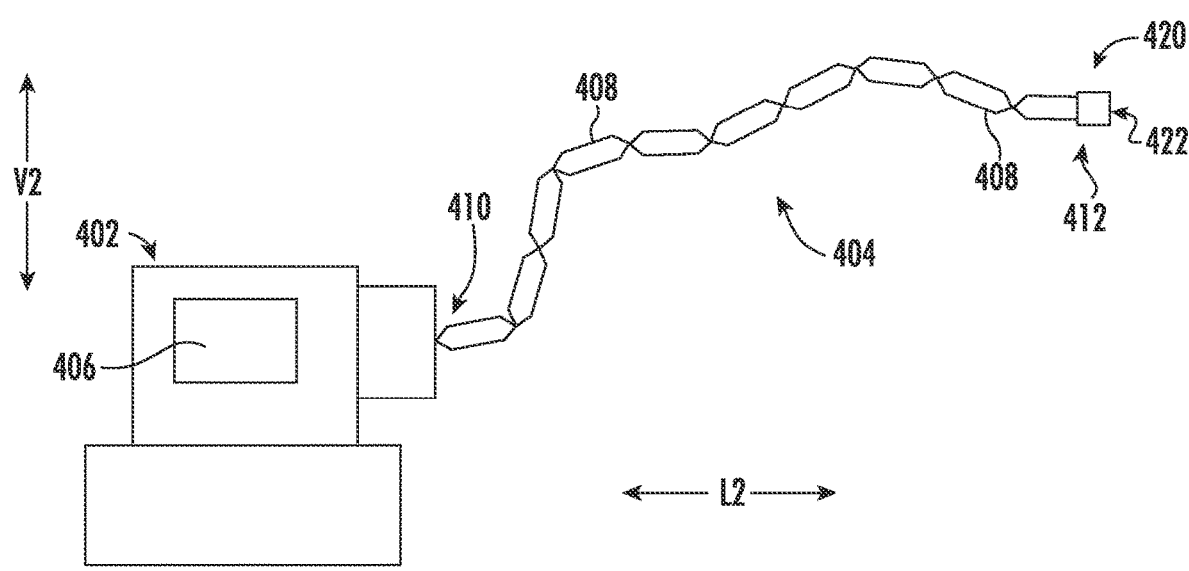
FIG. 9 is a schematic view of a robotic arm assembly in accordance with an exemplary embodiment of the present disclosure.

Further, referring particularly to the robotic arm 404, each segment 408 may be movable relative to a forward-adjacent segment 408 (i.e., a segment 408 immediately forward of the segment 408/towards the distal end 420) and aft-adjacent segment 408 (i.e., a segment 408 immediately aft of the segment 408/towards the root end 410) along at least two degrees of operation, as is depicted, to form the two-dimensional shape of the robotic arm 404 in FIG. 9. For example, each segment 408 may be movable up or down relative to the forward-adjacent and aft-adjacent segments 408 along the vertical direction V2 of the robotic arm assembly 400. It will further be appreciated, however, that for the exemplary embodiment depicted each segment 408 is further movable relative to a respective forward-adjacent and aft-adjacent segment 408 along at least four degrees of operation. For example, each segment 408 may also be movable along a lateral direction (perpendicular to the longitudinal direction L2 and vertical direction V2) relative to the forward-adjacent and aft-adjacent segments 408. In such a manner, the robotic arm 404 may generally be movable to form various three-dimensional shapes. In such a manner, the robotic arm 404 may be movable to position the distal end 420 and gas outlet 422 proximate to a number of different components within an interior of the gas turbine engine.

Briefly, as noted, the robotic arm assembly 400 depicted is a motorized robotic arm assembly. Accordingly, it will be appreciated that in at least certain exemplary embodiments, the one or more motors 406 of the base 402 may generally pull on various wires (not shown) extending through the robotic arm 404 and terminating at individual segments 408 of the robotic arm 404. By pulling on these various wires, the one or more motors 406 of the base 402 may control a movement of the segments 408 of the robotic arm 404. However, in other embodiments, any other suitable configuration may be provided for controlling the robotic arm 404. In certain exemplary embodiments, the motors 406 may be operably coupled to a controller of the repair system (such as controller 234 of repair system 202).

It will further be appreciated, however, that in other exemplary embodiments, still other insertion tubes 208 may be provided. For example, in other embodiments the insertion tube 208 may be a manual snake arm assembly, manually moved into position. Alternatively, the insertion tube 208 may be a flexible, or semi-flexible tube that may be bent into a desired shape to position its distal end 220 at a desired location within the interior of the gas turbine engine. Other configurations are contemplated as well.

Moreover, in still other exemplary embodiments, the repair system 202 may have still other configurations. For example, it will be appreciated that in order to burn a carbonaceous deposit(s) in/on the component of the gas turbine engine, there must be heat and oxygen. In at least certain of the embodiments discussed above, as noted, the flow of hot gas 210 may be an ambient air or some other gas containing oxygen. It will be appreciated that in other exemplary embodiments, however, the heated and pressurized flow of gas 210 may not contain a desired amount of oxygen to effectively or efficiently burn the deposits (such as less than about 20% oxygen, such as less than about 10% oxygen, such as less than about 5% oxygen, such as about 0% oxygen). With such an exemplary embodiment, the repair system 202 may either pyrolyze the deposits, or may include a separate oxygen source for providing oxygen to the deposit being treated.

Figure 10:
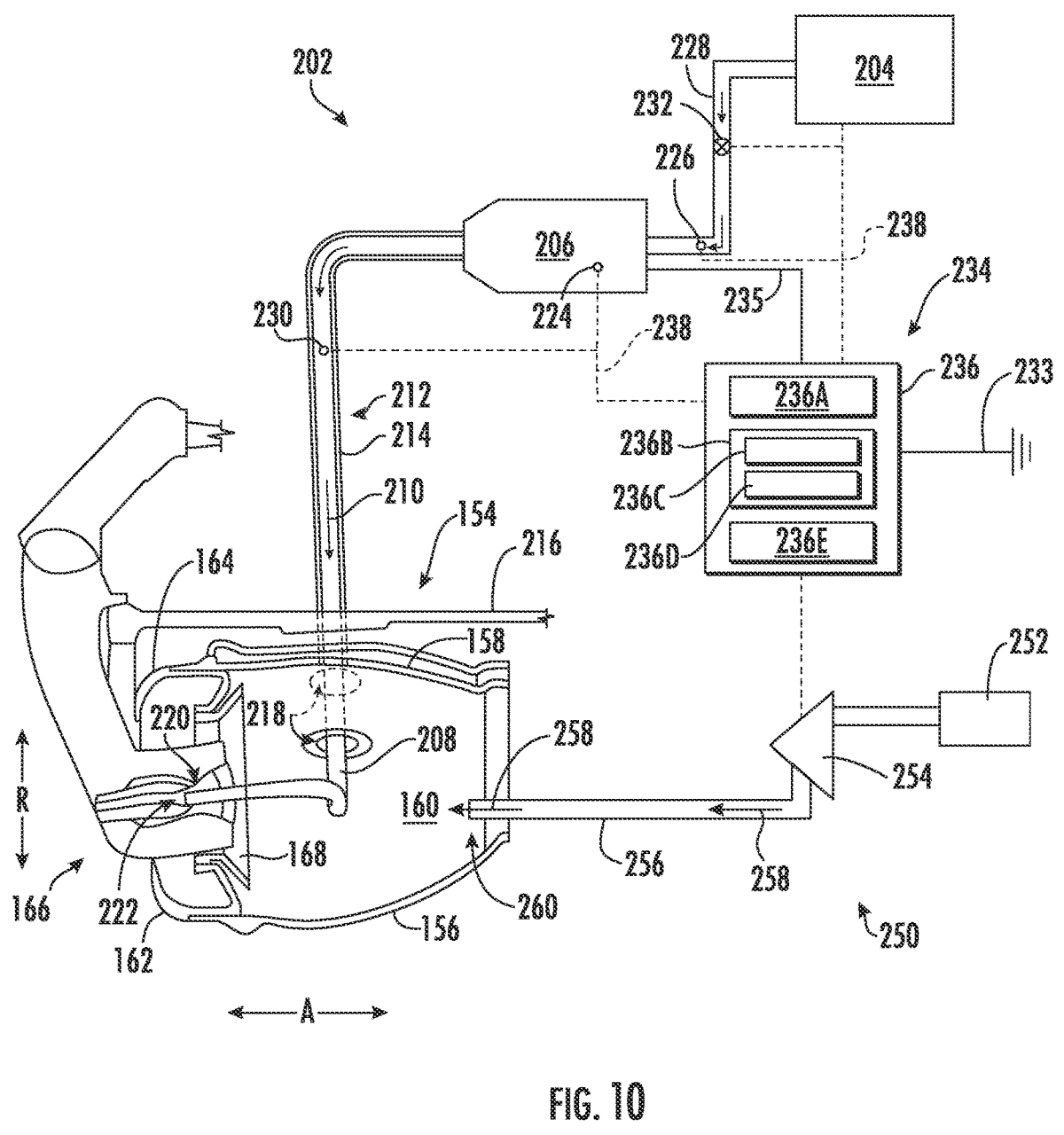

For example, referring briefly to FIG. 10, providing a schematic view of a repair system 202 in accordance with another exemplary embodiment of the present disclosure, it will be appreciated that the exemplary repair system 202 further includes an oxygen delivery system 250, separate from the gas flowpath through the insertion tube 208. For the embodiment depicted, the oxygen delivery system 250 includes an oxygen source 252, a pump 254, and a delivery line 256. The oxygen delivery system 250 may accordingly provide for a flow of oxygen 258 to the component being cleaned, and more specifically to the carbonaceous deposit of the component. For the embodiment of FIG. 10, the delivery line 256 defines a distal end 260 and extends through the core air flowpath of the engine and to the combustion chamber 160, such that the distal end 258 is within the combustion chamber 160. However, in other embodiments, the delivery line 256 additionally, or alternatively, may extend through an access port 218 separate from the access port 218 through which the insertion tube 208 extends, may extend through the same access port 218 through which the insertion tube 208 extends, may connect with a fuel circuit of the fuel delivery system upstream of the fuel nozzle 166 (such that it provides oxygen 258 through the fuel nozzle 166; see, e.g., FIG. 11), etc.

In at least certain of such exemplary embodiments, the oxygen 258 may be pure oxygen (about 100% oxygen), or alternatively may be any suitable oxygen-containing gas. For example, in certain embodiments, the oxygen source 252 may be an ambient air source containing between about 15% oxygen and about 30% oxygen. Further, although the distal end 260 of the delivery tube 256 is not depicted as being proximate the component being repaired/cleaned (i.e., the nozzle 166 for the embodiment shown), in other exemplary aspects, the distal end 260 may be positioned proximate the component being repaired.

Figure 11:
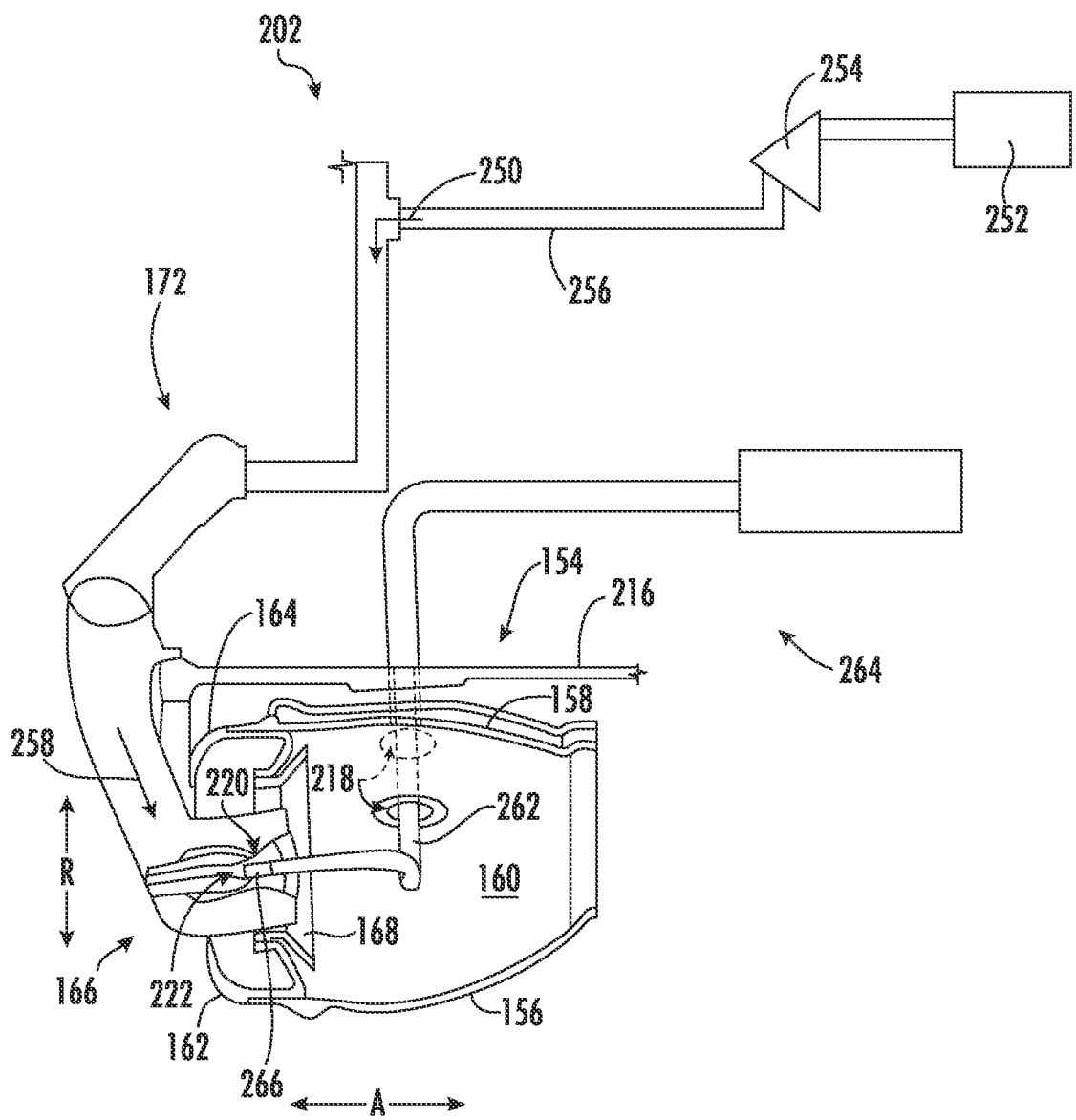
FIG. 11 is a schematic, cross-sectional view of a combustor assembly in accordance with yet another exemplary embodiment of the present disclosure.

It will further be appreciated that in still other embodiments, the repair system 202 may have still other configurations. For example, referring now to FIG. 11 providing a schematic view of a repair system 202 in accordance with another exemplary embodiment of the present disclosure, it will be appreciated that the exemplary repair system 202 is still configured to heat the component having the carbonaceous deposit, however, for the embodiment depicted, the repair system 202 is configured to heat the component through conductive heat transfer using a heating probe 262 of a heating assembly 264. The heating probe 262 may extend through an access port 218 of the engine (similar to the insertion tube 208) and may contact the component with the deposit. More specifically, for the embodiment depicted, the heating probe 262 includes a heating tip 266 configured to contact the component and heat the component. The heating probe 262 depicted is an electrical resistance heater, but in other embodiments may have any other suitable configuration/heat source. The heating probe 262 may heat the component in the absence of oxygen to pyrolyze the deposit, or alternatively, such as in the embodiment depicted, the repair system 202 may include a separate oxygen delivery system 250. The oxygen delivery system 250 of FIG. 11 is similar to the oxygen delivery system 250 of FIG. 10. However, for the embodiment depicted, the delivery tube 256 is in airflow communication with a fuel delivery system 172 including the component being repaired/cleaned (i.e., the fuel nozzle 166) at a location upstream of the fuel nozzle 166.

It will be appreciated, however, that in other embodiments, the oxygen delivery system 250 of FIG. 11 may have any other suitable configuration, such as the configuration of FIG. 10. Further, it will be appreciated that in still other exemplary embodiments, where the repair system 202 includes a separate oxygen delivery system 202 and heating system, the repair system 202 may instead provide a flow of heated and pressurized gas 210 to the fuel delivery system at a location upstream of the deposit in/on the fuel conveying component to heat the fuel conveying component and deposit. With such a configuration, a separate oxygen delivery system 250 may be provided. Alternatively, however, the flow of heated and pressurized gas 210 may have a desired oxygen content such that a separate oxygen delivery system 250 is not needed (and thus is not included).

Figure 12:
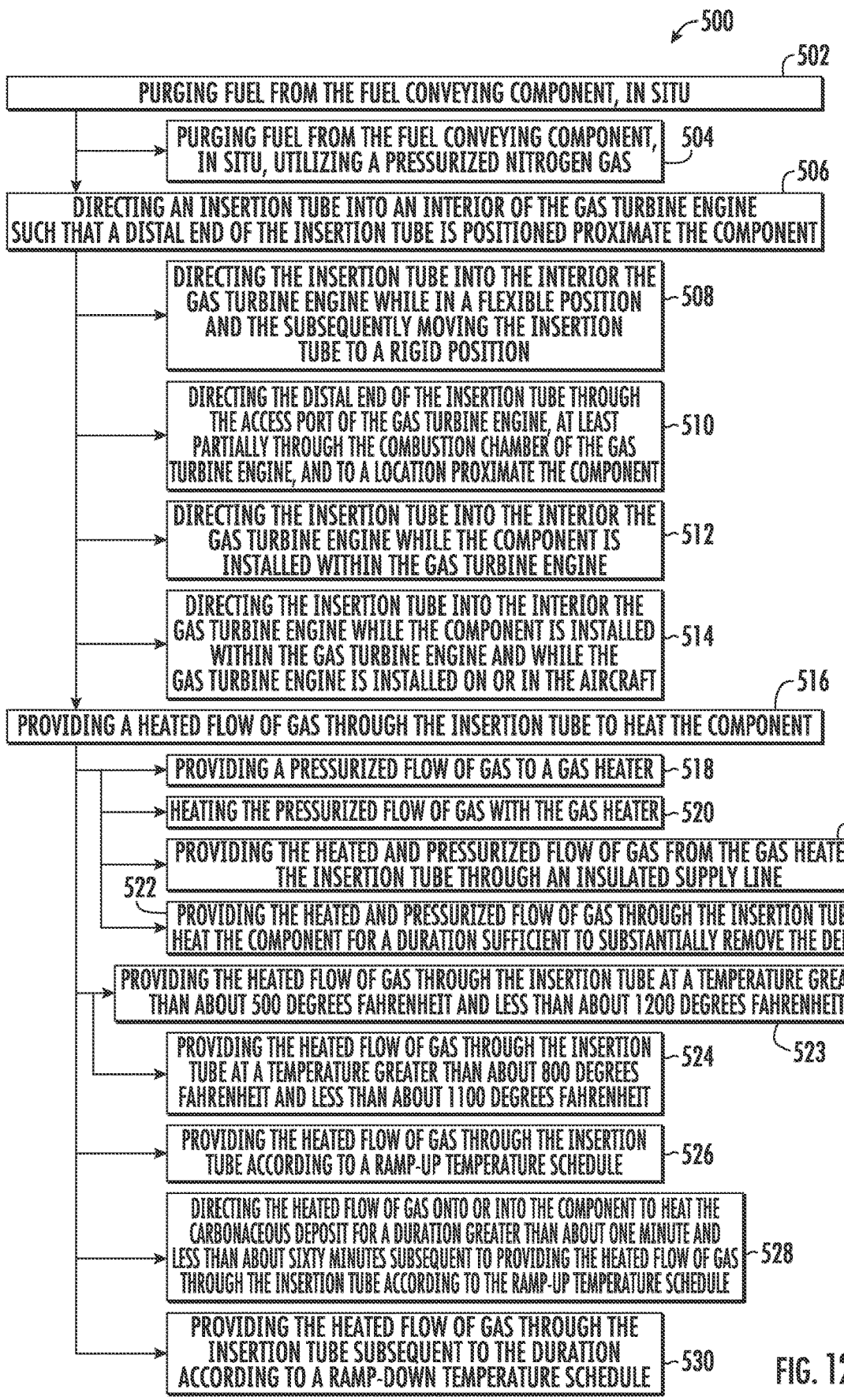
FIG. 12 is a flow diagram of a method for repairing a component of a gas turbine engine in situ in accordance with an exemplary aspect of the present disclosure.

Referring now to FIG. 12, a method 500 of repairing a component of the gas turbine engine in situ in accordance with an exemplary aspect of the present disclosure is provided. In certain exemplary aspects, the method 500 may utilize the exemplary repair system 202 described above on one or more of the exemplary gas turbine engines also described above. Accordingly, it will be appreciated that the component being repaired includes a deposit (such as a carbonaceous deposit (e.g., a coke deposit) or other type of deposit).

More specifically, it will be appreciated that in certain exemplary aspects the component may be a fuel conveying component, or an oil conveying component. For the exemplary aspect depicted, the component is a fuel conveying component, such as a fuel nozzle. Accordingly, the method 500 includes at (502) purging fuel from the fuel conveying component, in situ. More specifically, purging fuel from the fuel conveying component, in situ, at (502) includes, for the exemplary aspect depicted, at (504) purging fuel from the fuel conveying component, in situ, utilizing a pressurized nitrogen gas. Purging fuel from the fuel conveying component, in situ, at (502) may occur prior to certain of the repair steps described below such as, e.g., providing a heat gas through the insertion tube of the component at (516). Notably, however, in other aspects, other pressurized gas may be used to purge fuel from the fuel conveying component, in situ, at (502), such as ambient air.

Referring still to FIG. 12, the exemplary method 500 also includes at (506) directing an insertion tube into an interior of the gas turbine engine such that a distal end of the insertion tube is positioned proximate the component. For the exemplary aspect depicted, the insertion tube is a selectively rigid insertion tube. Accordingly, with the present exemplary aspect, directing the insertion tube into the interior of the gas turbine engine at (506) includes at (508) directing the insertion tube into the interior the gas turbine engine while in a flexible position and subsequently moving the insertion tube to a rigid position. Notably, however, in other exemplary aspects, the insertion tube may alternatively be a rigid insertion tube having a fixed geometry, may be incorporated into a motorized or manual robotic arm assembly, may be a semi-rigid or flexible insertion tube, etc.

Regardless, it will be appreciated that the exemplary aspect of the method 500 depicted is utilized with a gas turbine engine defining an access port. For example, the access port may be, e.g., an igniter port providing access to a combustion chamber of the gas turbine engine. With such an exemplary aspect, directing the insertion tube into the interior the gas turbine engine at (506) further includes at (510) directing the distal end of the insertion tube through the access port of the gas turbine engine, at least partially through the combustion chamber of the gas turbine engine, and to a location proximate the component. However, in other aspects, the access port may be positioned at any other suitable location, or alternatively, alternative means may be provided for accessing the component in situ (e.g., navigating through a core air flowpath of the engine).

Moreover, as noted above, the method 500 depicted in FIG. 12 provides for repairing the component of the gas turbine engine in situ. As such, for the exemplary aspect of the method 500 depicted, directing the insertion tube into the interior the gas turbine engine at (506) further includes at (512) directing the insertion tube into the interior the gas turbine engine while the component is installed within the gas turbine engine. Moreover, it will be appreciated that in certain exemplary aspects, the insertion tube may further be directed into the interior the engine at (506) without any appreciable disassembly of the gas turbine engine. Moreover, still, in certain exemplary aspects, the gas turbine engine may be installed on or in an aircraft. With such an exemplary aspect, directing the insertion tube into the interior the gas turbine engine at (506) further includes at (514) directing the insertion tube into the interior the gas turbine engine while the component is installed within the gas turbine engine and while the gas turbine engine is installed on or in the aircraft. Such may allow for easier, more convenient, and more cost-effective repair of the component, as will be appreciated from the discussion below.

Having directed the insertion tube into the interior the gas turbine engine such that the distal end of the insertion tube is positioned proximate the component having the deposit, the method 500 further includes at (516) providing a heated flow of gas through the insertion tube to heat the component. More specifically, for the exemplary aspect depicted, providing the heated flow of gas through the insertion tube to heat the component at (516) includes at (518) providing a pressurized flow of gas to a gas heater, at (520) heating the pressurized flow of gas with the gas heater, at (521) providing the heated and pressurized flow of gas from the gas heater to the insertion tube through an insulated supply line, and at (522) providing the heated and pressurized flow of gas through the insertion tube to heat the component for a duration sufficient to substantially remove the deposit. With such an exemplary aspect, the heated and pressurized flow of gas provided through the insertion tube to heat the component may substantially remove such carbonaceous (or other) deposits to increase the functionality and/or operability of such component.

In such a manner, for the exemplary aspect depicted, providing the heated flow of gas through the insertion tube at (516) further includes at (523) providing the heated flow of gas through the insertion tube at a temperature greater than about 500 degrees Fahrenheit and less than about 1200 degrees Fahrenheit, and more specifically includes at (524) providing the heated flow of gas through the insertion tube at a temperature greater than about 800 degrees Fahrenheit and less than about 1100 degrees Fahrenheit. For clarity, these temperatures are of the flow of gas at the distal end of the insertion tube (i.e., as the flow of gas exits the insertion tube).

More specifically, it will be appreciated that for the exemplary aspect depicted, providing the heated flow of gas through the insertion tube to heat the component at (516) includes providing the heated flow of gas through the insertion tube to heat the component for a duration while the heated flow of gas is within a repair temperature range. The repair temperature range may be the temperature ranges described above at (523) and (524).

More specifically, still, it will be appreciated that the method 500 includes measures to reduce a likelihood of damaging one or more components of the gas turbine engine by exposing such components to an undesirably high temperature gradient. Accordingly, for the exemplary aspect depicted, providing the heated flow of gas through the insertion tube at (516) further includes at (526) providing the heated flow of gas through the insertion tube according to a ramp-up temperature schedule. The ramp-up temperature schedule may provide for a temperature increase rate of the heated flow of gas greater than about 50 degrees Fahrenheit per minute and less than about 550 degrees Fahrenheit per minute. More specifically, in at least certain exemplary aspects, the ramp-up temperature schedule may provide for a temperature increase rate of the heated flow of gas greater than about 150 degrees Fahrenheit per minute and less than about 450 degrees Fahrenheit per minute.

Providing the heated flow of gas through the insertion tube at (516) further includes directing the heated flow of gas through the insertion tube and onto the component to heat the deposit for a duration greater than about one minute and less than about sixty minutes, and more specifically includes at (528) directing the heated flow of gas onto or into the component to heat the deposit for a duration greater than about one minute and less than about sixty minutes subsequent to providing the heated flow of gas through the insertion tube according to the ramp-up temperature schedule at (526). Notably, providing the heated flow of gas through the insertion tube according to the ramp-up temperature schedule at (526) may include ramping up the temperature of the heated flow of gas through the insertion tube to a desired repair temperature (such as within the repair temperature ranges discussed above at (523) and (524)). Additionally, the duration may be a sufficient amount of time to pyrolyze the deposit of the component, or otherwise substantially remove such deposit, to restore the component to a desired operability and/or functionality.

Subsequently, for the embodiment depicted, providing the heated flow of gas through the insertion tube at (516) further includes at (530) providing the heated flow of gas through the insertion tube subsequent to the duration according to a ramp-down temperature schedule. In at least certain exemplary aspects, the ramp-down temperature schedule may provide for a temperature decrease rate of the heated flow of gas greater than about 50 degrees Fahrenheit per minute and less than about 550 degrees Fahrenheit per minute. Notably, providing the heated flow of gas through the insertion tube subsequent to the duration according to the ramp-down temperature schedule may include ramping down the temperature of the heated flow of gas through the insertion tube to within a safe operating range of an ambient temperature, such as within about 150 degrees of ambient, such as within about 100 degrees of ambient.

Figure 13:
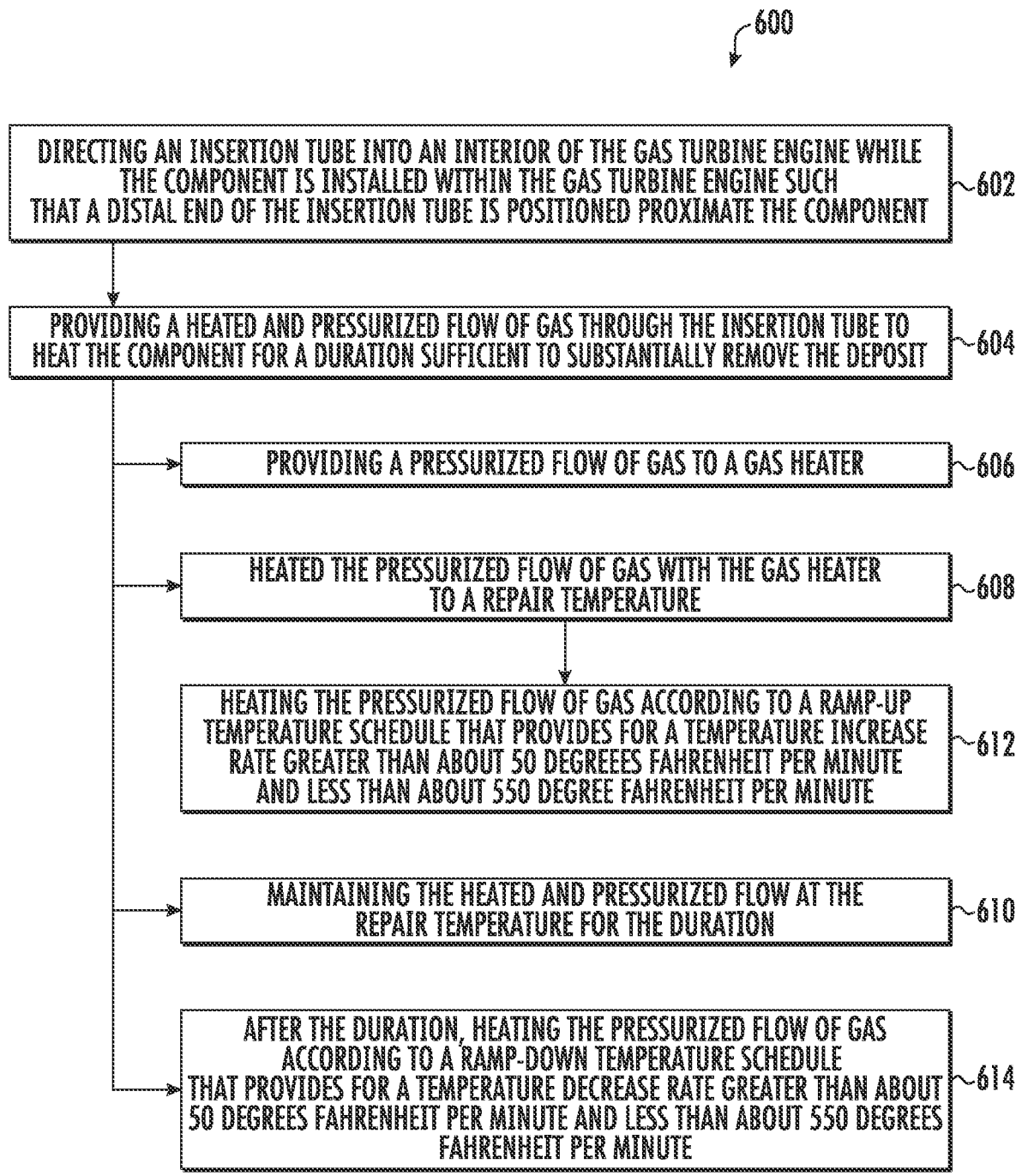
FIG. 13 is a flow diagram of a method for repairing a component of a gas turbine engine in situ in accordance with another exemplary aspect of the present disclosure.

Referring now to FIG. 13, an exemplary method 600 in accordance with another exemplary aspect of the present disclosure is provided. The method 600 may be similar to the method 500 described above with reference to FIG. 12.

For example, the method 600 is a method of repairing a component of a gas turbine engine in situ, with the component including a deposit, such as a carbonaceous deposit. The method 600 includes at (602) directing an insertion tube into an interior of the gas turbine engine while the component is installed within the gas turbine engine such that a distal end of the insertion tube is positioned proximate the component. The method 600 also includes at (604) providing a heated and pressurized flow of gas through the insertion tube to heat the component for a duration sufficient to substantially remove the deposit. More specifically, for the exemplary aspect depicted, providing the heated and pressurized flow of gas through the insertion tube at (604) includes at (606) providing a pressurized flow of gas to a gas heater; at (608) heating the pressurized flow of gas with the gas heater to a repair temperature; and at (610) maintaining the heated and pressurized flow at the repair temperature for the duration, wherein the duration is greater than about one minute and less than about sixty minutes.

In at least certain exemplary aspects, the repair temperature may be greater than 500 degrees Fahrenheit and less than 1500 degrees Fahrenheit, such as greater than about 800 degrees Fahrenheit and less than about 1100 degrees Fahrenheit.

Further, for the exemplary aspect depicted in FIG. 13, heating the pressurized flow of gas with the gas heater to the repair temperature at (608) includes at (612) heating the pressurized flow of gas according to a ramp-up temperature schedule that provides for a temperature increase rate greater than about 50 degrees Fahrenheit per minute and less than about 550 degrees Fahrenheit per minute. Further, still, for the exemplary aspect depicted, providing the heated and pressurized flow of gas through the insertion tube at (604) further includes at (614) after the duration, heating the pressurized flow of gas according to a ramp-down temperature schedule that provides for a temperature decrease rate greater than about 50 degrees Fahrenheit per minute and less than about 550 degrees Fahrenheit per minute.

Figure 14:
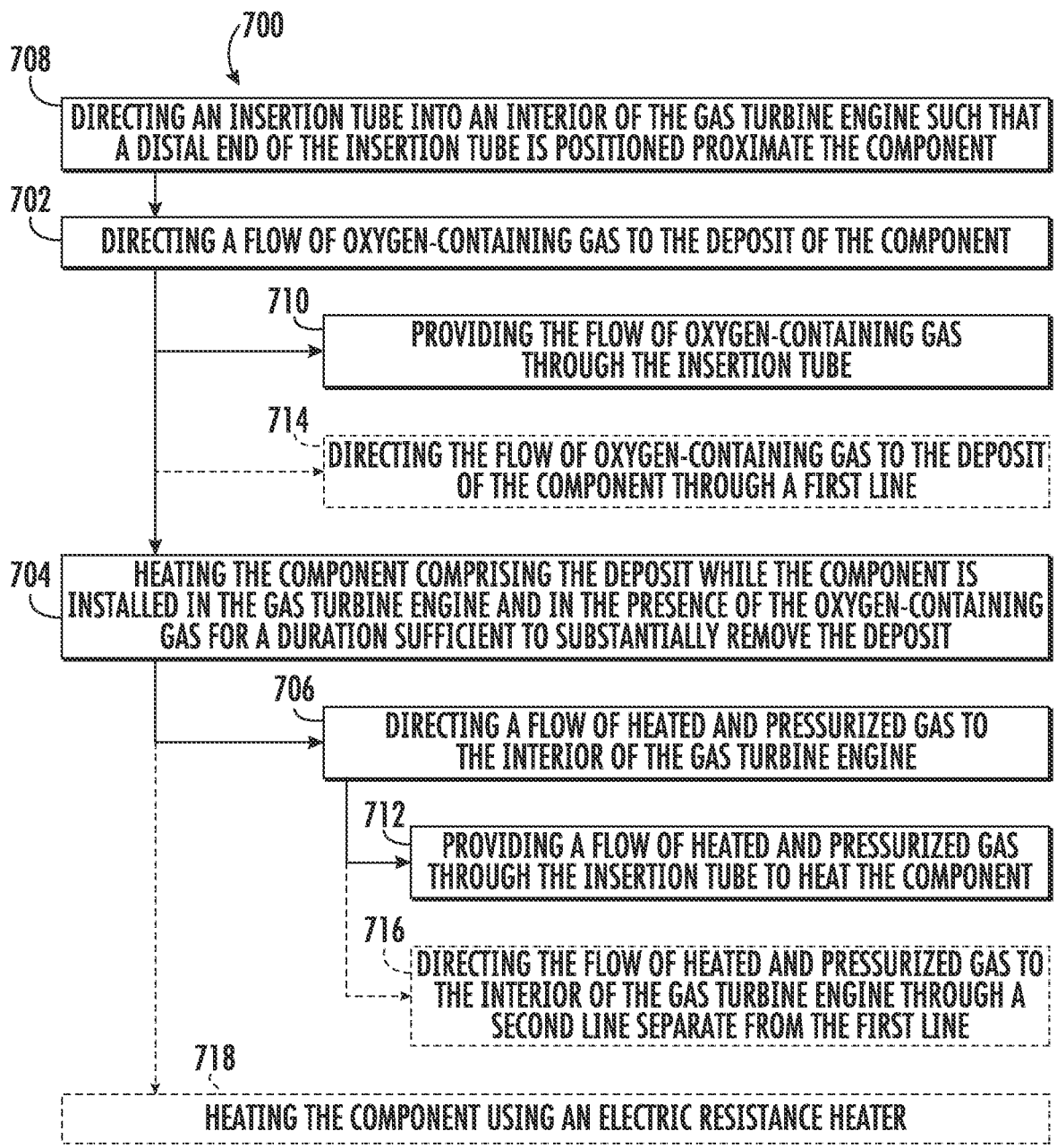
FIG. 14 is a flow diagram of a method for repairing a component of a gas turbine engine in situ in accordance with yet another exemplary aspect of the present disclosure.

Referring now to FIG. 14, an exemplary method 700 in accordance with yet another exemplary aspect of the present disclosure is provided. The method 700 may be similar to the methods 500 and 600 described above with reference to FIGS. 12 and 13, respectively.

The method 700 is generally directed to repairing a component of a gas turbine engine in situ, the component including a deposit. The method 700 includes at (702) directing a flow of oxygen-containing gas to the deposit of the component; and at (704) heating the component including the deposit while the component is installed in the gas turbine engine and in the presence of the oxygen-containing gas for a duration sufficient to substantially remove the deposit. Notably, heating the component at (704) may include heating the component to one or more of the temperature ranges described above for the heated and pressurized gas flows.

For the aspect depicted, heating the component at (704) includes at (706) directing a flow of heated and pressurized gas to the interior of the gas turbine engine. With such an exemplary aspect, the method 700 further includes at (708) directing an insertion tube into an interior of the gas turbine engine such that a distal end of the insertion tube is positioned proximate the component. Further with such an exemplary aspect, directing the flow of oxygen-containing gas to the deposit of the component at (702) includes at (710) providing the flow of oxygen-containing gas through the insertion tube, and directing the flow of heated and pressurized gas to the interior of the gas turbine engine at (706) includes at (712) providing the flow of heated and pressurized gas through the insertion tube to heat the component. For example, in such an exemplary aspect, the flow of oxygen-containing gas may be included in the flow of heated and pressurized gas, such that these steps are performed simultaneously, similar to the exemplary aspects described above with respect to methods 500 and 600.

However, in other exemplary aspects, as is depicted in phantom, directing the flow of oxygen-containing gas to the deposit of the component at (702) may include at (714) directing the flow of oxygen-containing gas to the deposit of the component through a first line, and directing the flow of heated and pressurized gas to the interior of the gas turbine engine at (706) may include at (716) directing the flow of heated and pressurized gas to the interior of the gas turbine engine through a second line separate from the first line. Notably, with such an exemplary aspect, the gas turbine engine may include a fuel delivery system and the component may be a fuel conveying component of the fuel delivery system. With such an exemplary aspect, the first line, the second line, or both may be in airflow communication with the fuel delivery system at a location upstream of the deposit of the fuel conveying component.

Alternatively, still, it will be appreciated that in certain exemplary aspects of the method 700 depicted, as is also shown in phantom, heating the component at (704) may include at (718) heating the component using an electric resistance heater.

As will be appreciated, aspects of methods 500 and 600 may further be incorporated into the exemplary aspect of method 700 described above, unless specifically limited, and vice versa.

Figure 15:
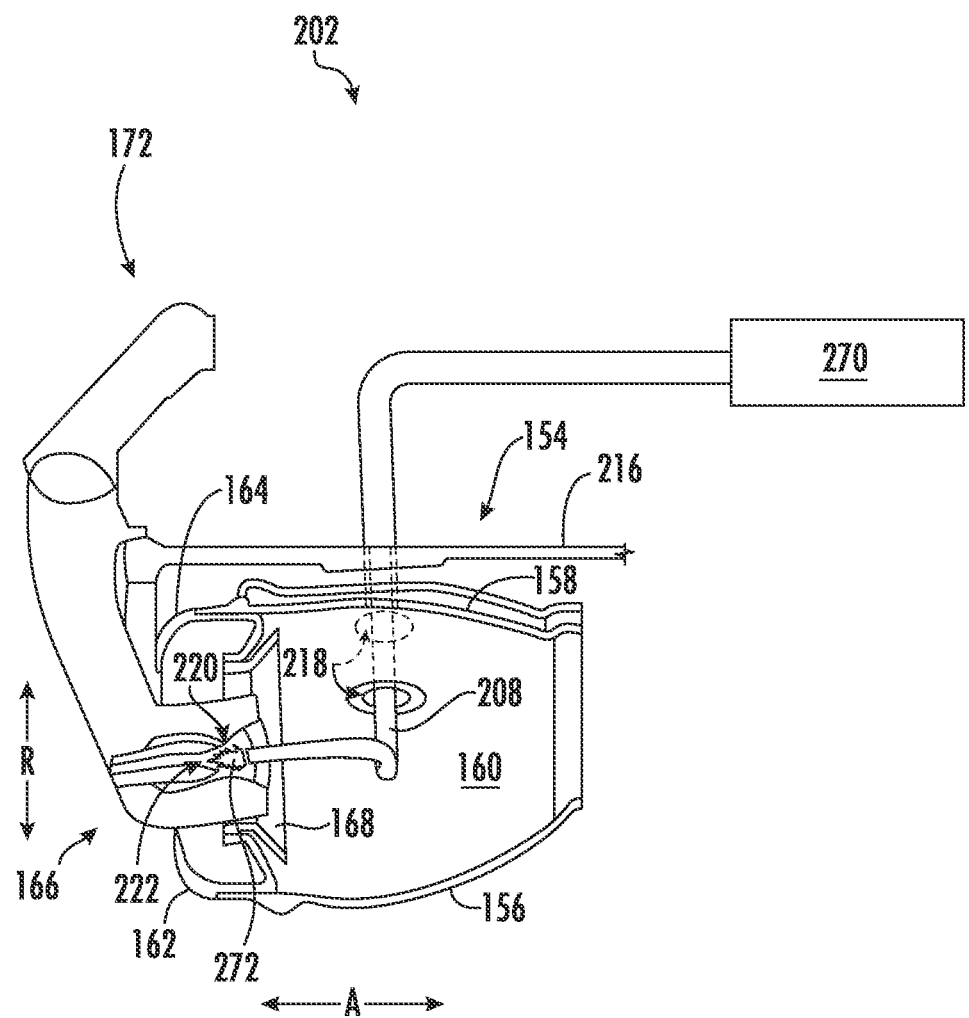
FIG. 15 is a schematic, cross-sectional view of a combustor assembly and repair system in accordance with yet another exemplary embodiment of the present disclosure.

Referring now to FIG. 15, yet another exemplary embodiment of a repair system 202 in accordance with the present disclosure is provided. The exemplary repair system 202 of FIG. 15 may generally be configured in a similar manner as one or more of the exemplary repair systems 202 described above.

In at least certain of the exemplary repair systems 202, gas flow is provided from a pressurized gas source 204 through an insertion tube 208 to the component. For the exemplary embodiment of FIG. 15, the flow of gas through the insertion tube 208 is a flow of flammable gas and the pressurized gas source is a flammable gas source 270. The flammable gas source 270 may provide the flow of flammable gas to/through the insertion tube 208, and through an outlet 222 of the insertion tube 208 at a distal end 220 of the insertion tube 208. Although not shown, the insertion tube 208 may include an ignitor or other feature for igniting the flow of flammable gas at the distal end 220 to form a flame 272 to burn a deposit on/in the component, or pyrolize the deposit. In such a manner, the insertion tube 208 may be configured to ignite the flammable gas at the distal end 220 to pyrolize and/or burn the deposit on the component.

Alternatively, the flammable gas may be configured to combust when provided to the environment (due to, e.g., a temperature of the environment or a component within the environment).

In certain exemplary embodiments, the flammable gas may be at least one of a hydrogen gas, a propane, a butane, methane, or ethylene. Specifically, for the embodiment shown, the flammable gas may be a hydrogen gas, and the flammable gas may be configured to mix with an environmental oxygen surrounding the component. In such a manner, the repair system 202 may ignite the flammable gas with use of environmental oxygen.

Alternatively, in other exemplary embodiments the repair tool 202 may be configured to provide a secondary flow of oxygen to facilitate combustion of the flammable gas. The secondary flow of oxygen may be mixed with the flammable gas upstream of the outlet 222 of the insertion tube 208 (e.g., within a mixer downstream of the flammable gas source 270 and upstream of the insertion tube 208), or may be provided separately to the distal end 220 (e.g., using a system similar to the embodiment of FIG. 10 or FIG. 11).

Moreover, in certain exemplary embodiment, the flammable gas source 270 may be any suitable flammable gas source. For example, the flammable gas source 270 may be configured to convert water ($H_2O$) into separate flows of hydrogen (as the flammable gas) and oxygen (which may optionally be separately provided to facilitate combustion). Alternatively, the flammable gas source 270 may be a tank or other reservoir of the flammable gas.

In such a manner, it will be appreciated that certain exemplary methods utilizing the exemplary repair tool 202 of FIG. 15 may provide a flow of gas through an insertion tube to heat a component, and more specifically may provide a flow of flammable gas through the insertion tube and may ignite the flammable gas to burn a deposit on/in the component or pyrolyze the deposit, cleaning the component of deposits in situ through pyrolytic cleaning.

Utilizing a system or method in accordance with FIG. 15 may facilitate a simpler cleaning of deposits on components of an engine in situ, as the system and method of FIG. 15 may not require separately heating the gas source.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

A method of repairing a component of a gas turbine engine in situ, the component comprising a deposit, the method comprising: directing a flow of oxygen-containing gas to the deposit of the component; and heating the component comprising the deposit while the component is installed in the gas turbine engine and in the presence of the oxygen-containing gas for a duration sufficient to substantially remove the deposit.

The method of any of the proceeding clauses wherein heating the component comprises directing a flow of heated and pressurized gas to the interior of the gas turbine engine.

The method of any of the proceeding clauses wherein further comprising: directing an insertion tube into an interior of the gas turbine engine such that a distal end of the insertion tube is positioned proximate the component, and wherein directing the flow of oxygen-containing gas to the deposit of the component comprises providing the flow of oxygen-containing gas through the insertion tube, wherein directing the flow of heated and pressurized gas to the interior of the gas turbine engine comprises providing the flow of heated and pressurized gas through the insertion tube to heat the component, and wherein the flow of oxygen-containing gas is included in the flow of heated and pressurized gas.

The method of any of the proceeding clauses wherein directing the flow of oxygen-containing gas to the deposit of the component comprises directing the flow of oxygen-containing gas to the deposit of the component through a first line, and wherein directing the flow of heated and pressurized gas to the interior of the gas turbine engine comprises directing the flow of heated and pressurized gas to the interior of the gas turbine engine through a second line separate from the first line.

The method of any of the proceeding clauses wherein the gas turbine engine includes a fuel delivery system, wherein the component is a fuel conveying component of the fuel delivery system, and wherein the first line, the second line, or both is in airflow communication with the fuel delivery system at a location upstream of the deposit of the fuel conveying component.

The method of any of the proceeding clauses wherein heating the component comprises heating the component using an electric resistance heater.

A method of repairing a component of a gas turbine engine in situ, the component comprising a deposit, the method comprising: directing an insertion tube into an interior of the gas turbine engine such that a distal end of the insertion tube is positioned proximate the component; and providing a heated flow of gas through the insertion tube to heat the component.

The method of any of the proceeding clauses wherein providing the heated flow of gas through the insertion tube comprises providing the heated flow of gas through the insertion tube at a temperature greater than about 500 degrees Fahrenheit and less than about 1200 degrees Fahrenheit.

The method of any of the proceeding clauses wherein providing the heated flow of gas through the insertion tube comprises providing the heated flow of gas through the insertion tube at a temperature greater than about 800 degrees Fahrenheit and less than about 1100 degrees Fahrenheit.

The method of any of the proceeding clauses wherein the component of the gas turbine engine is a fuel conveying component or an oil conveying component.

The method of any of the proceeding clauses wherein the component of the gas turbine engine is a spraybar of an augmentor or a fuel nozzle.

The method of any of the proceeding clauses wherein the component of the gas turbine engine is a fuel nozzle or a fuel nozzle swirler.

The method of any of the proceeding clauses wherein the component of the gas turbine engine is a fuel conveying component, and wherein the method further comprises: purging fuel from the fuel conveying component, in situ, prior to providing the heated flow of gas through the insertion tube.

The method of any of the proceeding clauses wherein purging fuel from the fuel conveying component, in situ, comprises purging fuel from the fuel conveying component, in situ, utilizing a pressurized nitrogen gas.

The method of any of the proceeding clauses wherein directing the insertion tube into the interior of the gas turbine engine comprises directing the insertion tube into the interior of the gas turbine engine while the component is installed within the gas turbine engine and the gas turbine engine is not operating.

The method of any of the proceeding clauses wherein the gas turbine engine is installed on or in an aircraft, and wherein directing the insertion tube into the interior of the gas turbine engine comprises directing the insertion tube into the interior of the gas turbine engine while the component is installed within the gas turbine engine and while the gas turbine engine is installed on or in the aircraft.

The method of any of the proceeding clauses wherein providing the heated flow of gas through the insertion tube comprises directing the heated flow of gas through the insertion tube and onto or into the component to pyrolize the carbonaceous deposit for a duration greater than about one minute and less than about sixty minutes.

The method of any of the proceeding clauses wherein providing the heated flow of gas through the insertion tube comprises providing the heated flow of gas through the insertion tube according to a ramp-up temperature schedule.

The method of any of the proceeding clauses wherein the ramp-up temperature schedule provides for a temperature increase rate of the heated flow of gas greater than about 50 degrees Fahrenheit per minute and less than about 550 degrees Fahrenheit per minute.

The method of any of the proceeding clauses wherein the ramp-up temperature schedule provides for a temperature increase rate of the heated flow of gas greater than about 150 degrees Fahrenheit per minute and less than about 450 degrees Fahrenheit per minute.

The method of any of the proceeding clauses wherein providing the heated flow of gas through the insertion tube further comprises: directing the heated flow of gas onto or into the component to heat the deposit for a duration greater than about 1 minute and less than about 60 minutes subsequent to providing the heated flow of gas through the insertion tube according to the ramp-up temperature schedule; and providing the heated flow of gas through the insertion tube subsequent to the duration according to a ramp-down temperature schedule.

The method of any of the proceeding clauses wherein the ramp-down temperature schedule provides for a temperature decrease rate of the heated flow of gas greater than about 50 degrees Fahrenheit per minute and less than about 550 degrees Fahrenheit per minute.

The method of any of the proceeding clauses wherein the insertion tube is a selectively rigid tube, and wherein directing the insertion tube into the interior of the gas turbine engine comprises directing the insertion tube into the interior of the gas turbine engine while in a flexible position and subsequently moving the insertion tube to a rigid position.

The method of any of the proceeding clauses wherein directing the insertion tube into the interior of the gas turbine engine comprises directing the distal end of the insertion tube through an access port of the gas turbine engine, through a combustion chamber of the gas turbine engine, and to a location proximate the component.

The method of any of the proceeding clauses wherein the insertion tube is a selectively rigid tube, and wherein directing the insertion tube into the interior of the gas turbine engine comprises directing the insertion tube into the interior of the gas turbine engine while in a flexible position and subsequently moving the insertion tube to a rigid position.

The method of any of the proceeding clauses wherein providing the flow of gas through the insertion tube to heat the component comprises providing a flow of flammable gas through the insertion tube and igniting the flammable gas to burn a deposit on the component, in the component or both or pyrolyze the deposit on the component, in the component or both.

The method of any of the proceeding clauses wherein the flammable gas is at least one of a hydrogen gas, a propane, or a butane.

The method of any of the proceeding clauses wherein providing the flow of flammable gas through the insertion tube and igniting the flammable gas to burn a deposit on the component, in the component or both or pyrolyze the deposit on the component, in the component or both further comprises providing a flow of oxygen to mix with the flammable gas.

The method of any of the proceeding clauses wherein providing the flow of flammable gas through the insertion tube and igniting the flammable gas to burn or the deposit on the component, in the component or both or pyrolyze the deposit on the component, in the component or both comprises igniting the flammable gas with use of environmental oxygen.

A system for repairing a component of a gas turbine engine having a deposit, the gas turbine engine defining an interior and the component positioned at least partially within the interior, the system comprising: a pressurized gas source; a gas heater in airflow communication with the pressurized gas source; and an insertion tube in airflow communication with the gas heater and defining a distal end, the insertion tube configured to be inserted into the interior of the gas turbine engine such that the distal end is positioned proximate the component of the gas turbine engine.

The system of any of the proceeding clauses wherein the insertion tube is a selectively rigid insertion tube movable between a flexible position and a rigid position.

The system of any of the proceeding clauses wherein the insertion tube is a first insertion tube, wherein the component of the gas turbine engine is a first component, wherein the gas turbine engine further comprises a second component, and wherein the system further comprises a second insertion tube defining a distal end configured to be inserted into the interior of the gas turbine engine such that the distal end of the second insertion tube is positioned proximate the second component of the gas turbine engine.

The system of any of the proceeding clauses wherein the first insertion tube defines a first geometry, wherein the second insertion tube defines a second geometry, and wherein the first geometry is different than the second geometry.

The system of any of the proceeding clauses wherein further comprising: an insulated supply line extending between the gas heater and the insertion tube for providing a heated flow of gas from the gas heater to the insertion tube.

The system of any of the proceeding clauses wherein the gas heater is configured to heat a flow of gas from the pressurized gas source to a temperature of at least 500 degrees Fahrenheit and up to about 1500 degrees Fahrenheit.

The system of any of the proceeding clauses wherein the component of the gas turbine engine is a fuel conveying component or an oil conveying component.

The system of any of the proceeding clauses wherein the component of the gas turbine engine is a fuel nozzle.

The system of any of the proceeding clauses wherein further comprising: a sensor operably coupled to the gas heater; and a controller operably coupled to the sensor for receiving data indicative of a temperature of a flow of gas through the gas heater, and further operably coupled to the gas heater for controlling the gas heater.

The system of any of the proceeding clauses wherein the controller comprises one or more processors and a memory, the memory storing data, the data including one or more instructions, the one or more instructions, when executed by the one or more processors, causing the system to perform functions, the functions including: providing a heated flow of gas through the insertion tube according to a ramp-up temperature schedule.

The system of any of the proceeding clauses wherein the insertion tube includes an alignment feature at the distal end.

The system of any of the proceeding clauses wherein the insertion tube includes a flexible section configured to elastically deform.

A gas turbine engine assembly comprising: a fluid system; an outer casing, the gas turbine engine defining an interior at a location within the outer casing; a component positioned at least partially within the interior and fluidly connected to the fluid system, the component comprising a deposit; and a repair system comprising a pressurized gas source; a gas heater in airflow communication with the pressurized gas source; and an insertion tube in airflow communication with the gas heater and defining a distal end having an airflow outlet, the insertion tube extending at least partially into the interior of the gas turbine engine such that the distal end is positioned proximate the component of the gas turbine engine for providing a flow of heated gas to the component.

The gas turbine engine of any of the proceeding clauses wherein the fluid system is a fuel delivery system, and wherein the component is a fuel conveying component.

The gas turbine engine of any of the proceeding clauses wherein the fuel conveying component is a fuel nozzle.

A method of repairing a component of a gas turbine engine in situ, the component comprising a deposit, the method comprising: directing an insertion tube into an interior of the gas turbine engine while the component is installed within the gas turbine engine such that a distal end of the insertion tube is positioned proximate the component; and providing a heated and pressurized flow of gas through the insertion tube to heat the component for a duration sufficient to substantially remove the deposit.

The method of any of the proceeding clauses wherein providing the heated and pressurized flow of gas through the insertion tube comprises: providing a pressurized flow of gas to a gas heater; heating the pressurized flow of gas with the gas heater to a repair temperature greater than about 500 degrees Fahrenheit and less than about 1500 degrees Fahrenheit; and maintaining the heated and pressurized flow at the repair temperature for the duration, wherein the duration is greater than about one minute and less than about sixty minutes.

The method of any of the proceeding clauses wherein the repair temperature is greater than about 800 degrees Fahrenheit and less than about 1100 degrees Fahrenheit.

The method of any of the proceeding clauses wherein heating the pressurized flow of gas with the gas heater to the repair temperature comprises heating the pressurized flow of gas according to a ramp-up temperature schedule that provides for a temperature increase rate greater than about 50 degrees Fahrenheit per minute and less than about 550 degrees Fahrenheit per minute.

The method of any of the proceeding clauses wherein providing the heated and pressurized flow of gas through the insertion tube further comprises: after the duration, heating the pressurized flow of gas according to a ramp-down temperature schedule that provides for a temperature decrease rate greater than about 50 degrees Fahrenheit per minute and less than about 550 degrees Fahrenheit per minute.

What is claimed is:

1. A system for repairing a component of a gas turbine engine having a deposit, the gas turbine engine defining an interior and the component positioned at least partially within the interior, the system comprising:
   a controller;
   a pressurized gas source;
   a gas heater coupled to the controller and in airflow communication with the pressurized gas source; and
   an insertion tube defining a proximal end and a distal end, an output of the gas heater in airflow communication with the proximal end, the insertion tube configured to be inserted into the interior of the gas turbine engine such that the distal end is positioned proximate the component of the gas turbine engine;
   wherein the controller executes computer instructions that selectively control operation of the gas heater such that the gas heater heats a flow of gas from the pressurized gas source to a temperature greater than about 500 degrees Fahrenheit and less than about 1200 degrees Fahrenheit.

2. The system of claim 1, wherein the insertion tube is a selectively rigid insertion tube movable between a flexible position and a rigid position.

3. The system of claim 1, wherein the component of the gas turbine engine is a fuel conveying component or an oil conveying component.

4. The system of claim 1, wherein the deposit is a carbonaceous deposit and wherein the insertion tube is configured to direct a heated flow of gas onto or into the component to pyrolize the carbonaceous deposit for a duration greater than about one minute and less than about sixty minutes.

5. The system of claim 1, wherein the insertion tube is configured to provide a heated flow of gas through the insertion tube according to a ramp-up temperature schedule.

6. The system of claim 5, wherein the ramp-up temperature schedule provides for a temperature increase rate of the heated flow of gas greater than about 50 degrees Fahrenheit per minute and less than about 550 degrees Fahrenheit per minute.

7. The system of claim 5, wherein the insertion tube is configured to direct the heated flow of gas onto or into the component to heat the deposit for a duration greater than about 1 minute and less than about 60 minutes subsequent to providing the heated flow of gas through the insertion tube according to the ramp-up temperature schedule.

8. The system of claim 7, wherein the insertion tube is configured to provide the heated flow of gas through the insertion tube subsequent to the duration according to a ramp-down temperature schedule.

9. The system of claim 1, wherein the pressurized gas source provides a flammable gas, and wherein the insertion tube is configured to ignite the flammable gas to burn the deposit on the component, in the component, or both, or pyrolyze the deposit on the component, in the component, or both.

10. The system of claim 1, wherein the pressurized gas source provides a flammable gas, and wherein the flammable gas is at least one of a hydrogen gas, a propane, or a butane.

11. A system for repairing a component of a gas turbine engine having a deposit, the gas turbine engine defining an interior and the component positioned at least partially within the interior, the system comprising:
   a gas source; and
   an insertion tube in airflow communication with the gas source and defining a distal end, the insertion tube configured to be inserted into the interior of the gas turbine engine such that the distal end is positioned proximate to the exterior of the component of the gas turbine engine;
   wherein the gas source is a flammable gas source for providing a flammable gas to the insertion tube, and wherein the insertion tube is configured to ignite the flammable gas into a flame extending from the distal end to pyrolyze the deposit on the exterior of the component;
   wherein the insertion tube is configured to be moved from a slacked position to a tensioned position.

12. The system of claim 11, wherein the deposit is a carbonaceous deposit and wherein the insertion tube is configured to direct the ignited flammable gas onto or into the component to pyrolize the carbonaceous deposit for a duration greater than about one minute and less than about sixty minutes.

13. The system of claim 11, wherein the insertion tube is configured to ignite the flammable gas to burn a deposit on the component, in the component, or both, or pyrolyze the deposit on the component, in the component, or both.

14. The system of claim 11, wherein the flammable gas is at least one of a hydrogen gas, a propane, a butane, a methane, or an ethylene.

* * * * *